(12) United States Patent
Bradley et al.

(10) Patent No.: US 8,229,791 B2
(45) Date of Patent: Jul. 24, 2012

(54) METHODS, SYSTEMS, AND COMPUTER INTEGRATED PROGRAM PRODUCTS FOR SUPPLY CHAIN MANAGEMENT

(75) Inventors: Randolph L. Bradley, St. Louis, MO (US); Alex Safavi, Maryland Heights, MO (US); Stephen D. King, O'Fallon, MO (US); Jenny B. Thompson, Long Beach, CA (US); Vikas Sinha, Plano, TX (US); Chandler H. Wilson, Edwardsville, IL (US)

(73) Assignee: The Boeing Company, Chicago, IL (US)

( * ) Notice: Subject to any disclaimer, the term of this patent is extended or adjusted under 35 U.S.C. 154(b) by 955 days.

(21) Appl. No.: 11/343,425

(22) Filed: Jan. 30, 2006

(65) Prior Publication Data

US 2007/0124009 A1    May 31, 2007

Related U.S. Application Data

(60) Provisional application No. 60/740,356, filed on Nov. 29, 2005.

(51) Int. Cl.
*G06G 1/14* (2006.01)
*G06Q 10/00* (2012.01)
*G06F 19/00* (2011.01)

(52) U.S. Cl. ............... 705/22; 705/28; 235/385
(58) Field of Classification Search ...... 705/28
See application file for complete search history.

(56) References Cited

U.S. PATENT DOCUMENTS

| | | | |
|---|---|---|---|
| 5,940,806 A * | 8/1999 | Danial | 705/26 |
| 6,885,902 B2 | 4/2005 | Crampton et al. | |
| 6,898,472 B2 | 5/2005 | Crampton et al. | |
| 7,058,587 B1 | 6/2006 | Horne | |
| 7,324,966 B2 | 1/2008 | Scheer | |
| 2002/0013731 A1 | 1/2002 | Bright et al. | |
| 2002/0049622 A1 | 4/2002 | Lettich et al. | |
| 2002/0138324 A1 | 9/2002 | Zarefoss et al. | |
| 2002/0147622 A1 | 10/2002 | Drolet et al. | |
| 2002/0161674 A1 * | 10/2002 | Scheer | 705/28 |
| 2003/0033180 A1 | 2/2003 | Shekar et al. | |
| 2003/0055753 A1 * | 3/2003 | Dellar et al. | 705/29 |
| 2003/0101107 A1 * | 5/2003 | Agarwal et al. | 705/28 |
| 2003/0120584 A1 | 6/2003 | Zarefoss et al. | |
| 2003/0126023 A1 | 7/2003 | Crampton et al. | |
| 2004/0019494 A1 | 1/2004 | Ridgeway et al. | |

(Continued)

OTHER PUBLICATIONS

International Search Report for PCT/US06/45232; Feb. 26, 2008; 10 pages.

(Continued)

*Primary Examiner* — Fahd Obeid
(74) *Attorney, Agent, or Firm* — Armstrong Teasdale LLP

(57) ABSTRACT

A computer program product for managing a supply chain process to maintain equipment is described. The computer program product includes a computer-readable storage medium having computer-readable program code embodied in the medium. The computer-readable program code includes a first executable portion for identifying and capturing data relevant to one or more sets of equipment maintenance requirements, a second executable portion for providing access to the capabilities of a plurality of inventory management, supply chain management, and equipment maintenance applications for preprocessing of the identified and captured data, a third executable portion for receiving the preprocessed data from the plurality of applications, and a fourth executable portion for integrating the preprocessed data into a solution to the one or more sets of equipment maintenance requirements.

26 Claims, 11 Drawing Sheets

U.S. PATENT DOCUMENTS

| | | |
|---|---|---|
| 2004/0128176 A1 | 7/2004 | Jordan et al. |
| 2004/0186794 A1* | 9/2004 | Renz et al. ............... 705/28 |
| 2005/0060327 A1* | 3/2005 | Kawahara et al. ............ 707/100 |
| 2005/0102175 A1* | 5/2005 | Dudat et al. ............ 705/10 |
| 2006/0015455 A1 | 1/2006 | Hahn-Carlson et al. |
| 2006/0173775 A1 | 8/2006 | Cullen, III et al. |

OTHER PUBLICATIONS

Muckstadt, J. et al.; "Guidelines for Collaborative Supply Chain System Design and Operation"; Technological Report No. 1286; Feb. 2001; 31 pages.

* cited by examiner

METHODS, SYSTEMS, AND COMPUTER INTEGRATED PROGRAM PRODUCTS FOR SUPPLY CHAIN MANAGEMENT

CROSS REFERENCE TO RELATED APPLICATIONS

This application claims the priority of U.S. Provisional Patent Application No. 60/740,356 entitled "Processes For Managing A Supply Chain Business For Equipment Maintenance" filed Nov. 29, 2005 which is herein incorporated herein by reference.

BACKGROUND OF THE INVENTION

The present invention generally relates to supply chain business computer program products and computer-implemented methods that facilitate equipment maintenance for one or more customers and, more particularly, relates to methods, configurations, computer-readable mediums, and integrated systems of systems for supply chain software to manage inventories of parts used to maintain equipment.

In order to reduce lifecycle support costs, government and commercial entities outsource support for equipment. This provides vendors with a profitable opportunity to bid to maintain the very equipment that they build. Such opportunities include Performance Based Logistics (PBL), Life Cycle Customer Support (LCCS), and Programmed Depot Maintenance (PDM) programs for managing the supply chain for maintaining equipment.

Known Commercial Off the Shelf (COTS) software typically meets some, but not all, business requirements for successfully managing these PBL, LCCS, and PDM programs. For example, such COTS software may not necessarily maximize the availability of critical equipment at minimum cost in order to manage healthy PBL, LCCS, and PDM programs, and manage the maintenance of equipment, including spare parts and repair services, throughout the lifecycle of the equipment; integrate and configure to meet a supply chain service provider's business requirements and those of its customers; and generate configurable business reports and custom developed software extensions.

Such COTS programs also may not integrate the supply chain service provider's and customer legacy data systems, manage inventories of spare parts by tracking management metrics to monitor the health of the supply chain, minimize the lifecycle cost of supporting the equipment, for example, managing categories of parts, such as consumables, obsolete parts, mechanical parts, electrical parts, depot maintenance, equipment being phased out, equipment being deployed for the first time, and deployable spares packages for field use away from the main operating location.

Inventory optimization companies have specialized solutions for determining inventory stocking levels and reorder points for single or multiple stocking locations. Known supply chain software solution vendors have well developed solutions for optimizing inventory stock levels, performing day-to-day asset management to maintain the optimized levels over time, and maintaining data in an integrated database. Known simulation vendors have developed Monte Carlo models which can reduce risk by evaluating the impact of inventory stocking decisions in a dynamic world before orders are placed. Known vendors of statistical analysis software have software that will determine the statistical distribution (such as Poisson, negative binomial, or normal) which best fits a stream of events. Consulting companies integrate software solutions from multiple vendors to meet the global needs of supply chain vendors.

However, in the typical case, individual department functions are compartmentalized and information is maintained in individual "buckets", leading to duplication of effort, inconsistencies between data sources, and lack of visibility into inventory across departments, organizations, vendors, and customers. In addition, known supply chain solution vendors have well developed solutions which integrate only the strategic, tactical, inventory management, and data repository functions. The use of simulation to reduce risk by verifying the results of an inventory analysis before committing to buy parts typically is not an integral feature of the product lines of today's supply chain vendors.

Others have attempted to re-optimize the entire network of service parts when doing tactical analysis on a day-to-day basis. This (a) leads to software performance issues when multiple asset managers are attempting to re-optimize the networks at the same time, or (b) leads to reductions in capability when "what if" analyses are restricted to overnight runs, resulting in a day wait before receiving results.

Known supply chain solutions use data repositories to duplicate the information required to manage assets. In order to interact with external systems, asset managers typically log onto these systems and cut and paste data. Also, known supply chain solutions provide some, but not all, components required to successfully manage a supply chain for maintenance parts. Customers must know their future process ahead of time to determine which tools, from which vendors, enable the complete process.

BRIEF DESCRIPTION OF THE INVENTION

In one aspect, a computer program product for managing a supply chain process to maintain equipment is provided. The computer program product comprises a computer-readable storage medium having computer-readable program code embodied in the medium. The computer-readable program code comprises a first executable portion for identifying and capturing data relevant to one or more sets of equipment maintenance requirements, a second executable portion for providing access to the capabilities of a plurality of inventory management, supply chain management, and equipment maintenance applications for preprocessing of the identified and captured data, a third executable portion for receiving the preprocessed data from the plurality of applications, and a fourth executable portion for integrating the preprocessed data into a solution to the one or more sets of equipment maintenance requirements.

In another aspect, a computer implemented method for managing a supply chain process to maintain equipment is provided. The method comprises providing a business rule configuration (BRC) module that provides access to the capabilities of a plurality of inventory management, supply chain management, and equipment maintenance applications, utilizing the BRC module to identify and capture data that is relevant to a set of equipment maintenance requirements, applying the identified and captured data to the plurality of applications, and receiving, from the BRC, a solution to the equipment maintenance requirements, based on an integration of the capabilities of the plurality of applications.

DETAILED DESCRIPTION OF THE INVENTION

Figure 1:
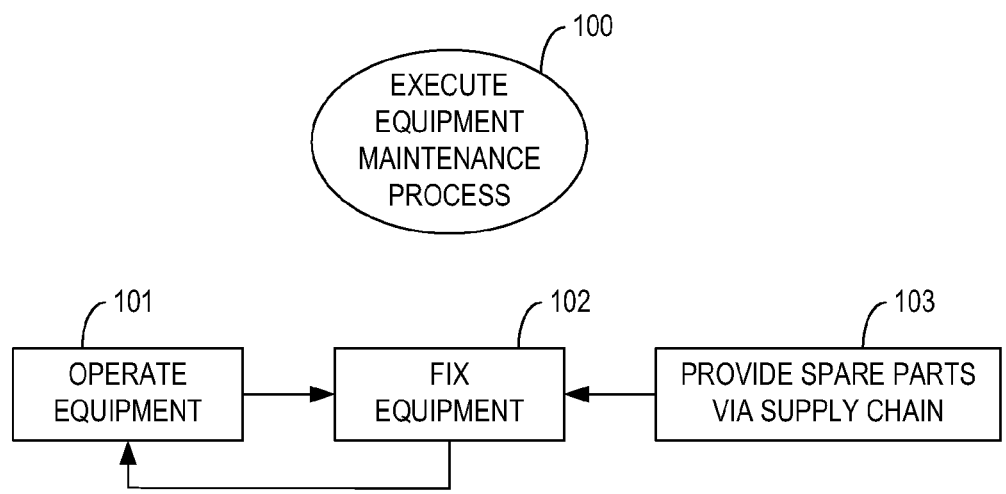
FIG. 1 illustrates a process for maintaining equipment using spare parts.

As described briefly above, embodiments of the present invention provide methods, systems, configurations, and computer-readable mediums for managing a supply chain process to maintain equipment for a customer. In the following detailed description, references are made to accompanying drawings that form a part hereof, and in which are shown by way of illustration specific embodiments or examples. These illustrative embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Embodiments of the present invention represent innovative business process models that seamlessly link data cleaning or preparation techniques, statistical demand forecasting algorithms, optimization algorithms for consumable and repairable parts, simulation technology for risk assessment, and tactical asset management tools for day-to-day analysis. These business process models successfully manage customer maintenance supply chains, service parts, reduce inventory costs, and maximize the availability of critical systems to perform a mission or generate revenue. Embodiments of the present invention represent an enterprise level solution to managing equipment on a global basis. Service parts are maintained at different repair centers depending upon the complexity of repair, and operated at different locations. Inventory is stored by different owners in different locations which is accomplished through disciplined processes and integrated use of formerly independent software solutions.

Specifically, manage the maintenance of equipment, including spare parts and repair services, throughout the lifecycle of the equipment, minimize the lifecycle cost of supporting the equipment, and synchronize support across multiple suppliers, users, shippers, warehouses, and maintainers worldwide are managed. Additionally, synchronization and access to time critical information systems across multiple operating systems, databases, legacy systems, and security protocols, optimization of inventory stock levels (to maximize fill rate of parts from in stock inventory at minimum cost, or maximize availability of a fleet of operating equipment at minimum cost) across multiple stocking locations, and maintenance of the optimized levels over time are provided.

Referring now to the drawings, in which like numerals represent like elements through the several figures, aspects of the present invention and the illustrative operating environment will be described. The figures and the following discussion are intended to provide a brief, general description of a suitable computing environment in which to practice embodiments of the present invention. The following description is in the general context of integrated program modules that execute in conjunction with a BIOS program that executes on a personal or server computer. Those skilled in the art will recognize that such modules may also be implemented in combination with other program modules.

Generally, program modules include routines, programs, configurations, components, data structures, and other types of structures that perform particular tasks or implement particular abstract data types. Moreover, those skilled in the art will appreciate that such modules may be practiced with other computer system configurations, including hand-held devices, multiprocessor systems, microprocessor-based or programmable consumer electronics, minicomputers, mainframe computers, and the like. Such modules may also be practiced in distributed computing environments where tasks are performed by remote processing devices that are linked through a communications network. In a distributed computing environment, program modules may be located in both local and remote memory storage devices.

Referring now to FIG. 1, an operational flow is illustrated which describes an equipment maintenance process 100. Organizations operate equipment 101 to generate revenue or perform a mission. The equipment must be in repair to operate. Maintainers use spare parts to fix the equipment 102. The spare parts must be in stock to fix the equipment. The herein described processes and computer program capabilities analyze spare parts to maximize the availability of equipment to facilitate operating at a lowest possible total cost. Spare parts are provided through a supply chain 103.

Figure 2:
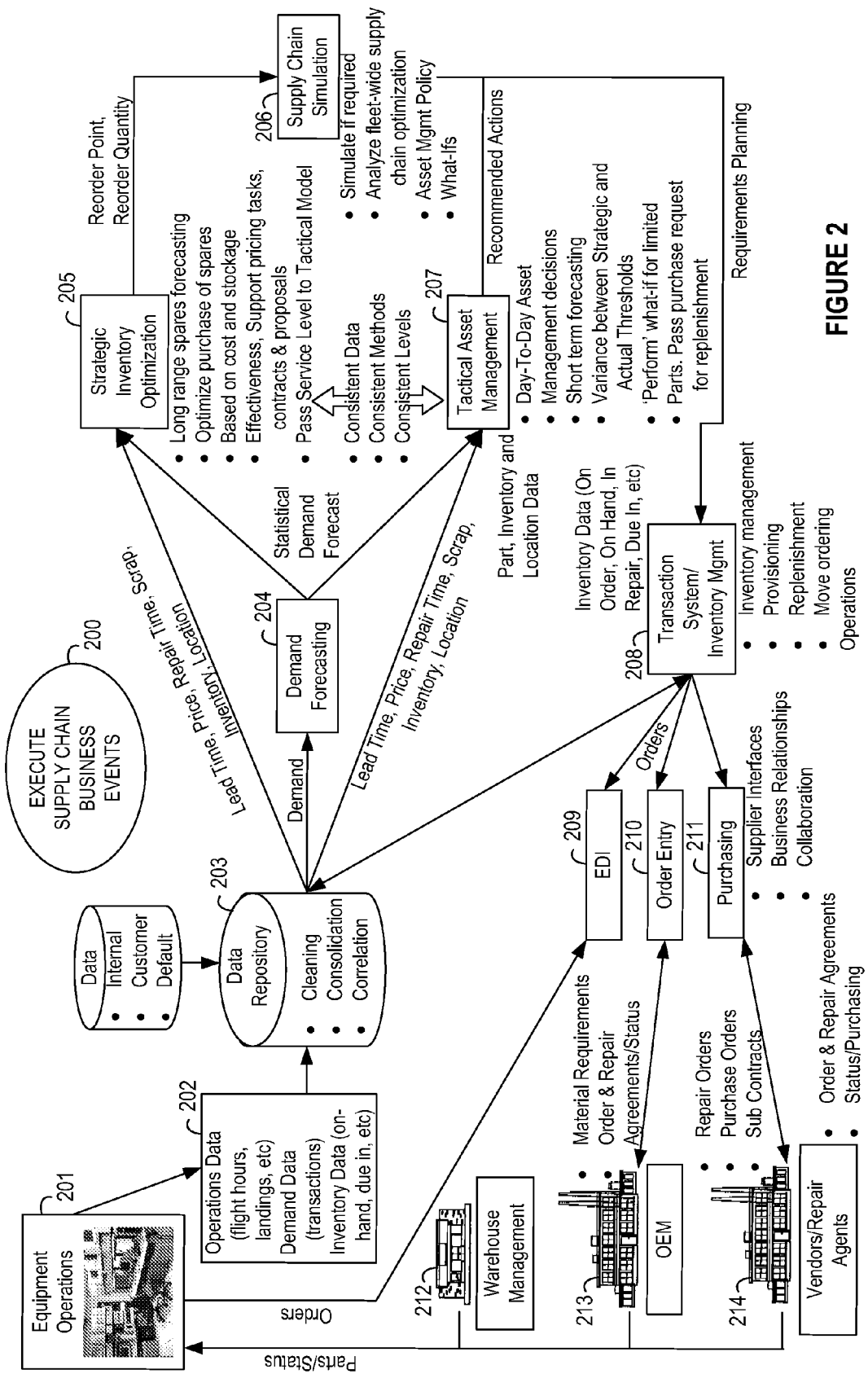
FIG. 2 is a schematic diagram of a supply chain management business event flow.

FIG. 2 illustrates a schematic diagram of a supply chain management business event flow 200. In one embodiment, as the equipment is operated 201, the operations data 202 is retrieved by or fed into a data repository 203. The data in the data repository 203 is prepared for use among a plurality of applications which are further described below and illustrated, for example, in FIG. 6. Data preparation may include cleaning, consolidating, and/or correlating the data for use.

Next the data is forwarded to a demand forecasting model 204. Here the demand forecasting application generates a statistical demand forecast. The forecasting methodology is selected from a forecasting method library based on a profile of the characteristics of the statistical demand forecast experienced by the associated customer.

Next, the demand forecast and associated data are forwarded to a strategic inventory optimization model 205. The strategic inventory optimization model 205 utilizes the average number of annual backorders from strategic global inventory optimization model to set the safety stock for the "part-at-a-time" tactical optimization model 207. This keeps the theoretical strategic model 205, typically run yearly or quarterly, in synch with the tactical model 207, which is run daily to correct inventory imbalances in response to the vagaries of the real world. Safety stock, which is excess inventory held to respond to uncertainty in demand, is defined as the difference between the safety stock determined using an expected annual number of backorders stock level formula and the classical Wilson Economic Order Quantity (EOQ) stock level formula. The Wilson EOQ model, developed in the 1930's, assumes that when stock level reaches zero, a new order arrives which was placed a lead-time away. The Wilson EOQ model assumes no variability of demand. This new safety stock formula classifies any stock level in excess (or shortage) of the Wilson EOQ model as safety stock. Safety stock may therefore be either positive or negative, because during an inventory optimization, one may intentionally run out of more expensive, low volume parts. A disciplined spares modeling process is used to standardize the inventory optimization process for maintenance spares.

Additionally, a graphical representation of stock level is utilized over time to convey the impact of inventory policy decisions in the "part-at-a-time" tactical analysis tool 207. The graphical representation may be generated and rendered via a web server and Graphical User Interface (GUI) application as further described below.

Also, a supply chain simulation 206 has the ability, through the integration of simulation technology, to understand how the system will respond under varying conditions. This allows for risk reduction by simulating the results of the strategic inventory optimization 205, which assumes steady stead equipment operations 201, to be evaluated under varying operating tempos. In addition, asset management policy including "what if" scenarios are trialed by the supply chain simulation 206.

A transaction system model 208 is used for inventory management and including provisioning and replenishment or move ordering. Once replenishment occurs the updated data is forwarded to the data system model 203 for processing a refreshed demand forecast at demand forecasting model 204. Thus, closed loop planning is a key capability of the supply chain business process. Orders for spare parts used to maintain equipment operations 201 arrive via Electronic Data Interchange (EDI) to the inventory management system 208. The orders are fulfilled from the Warehouse 212 stocking the parts. Orders may also be placed via order entry 210 to the Original Equipment Manufacturer 213 making the spare parts. In addition, orders may be placed via a purchasing system 211 to the vendors and/or repair agents 214 contracted to repair the spare parts.

Figure 6:
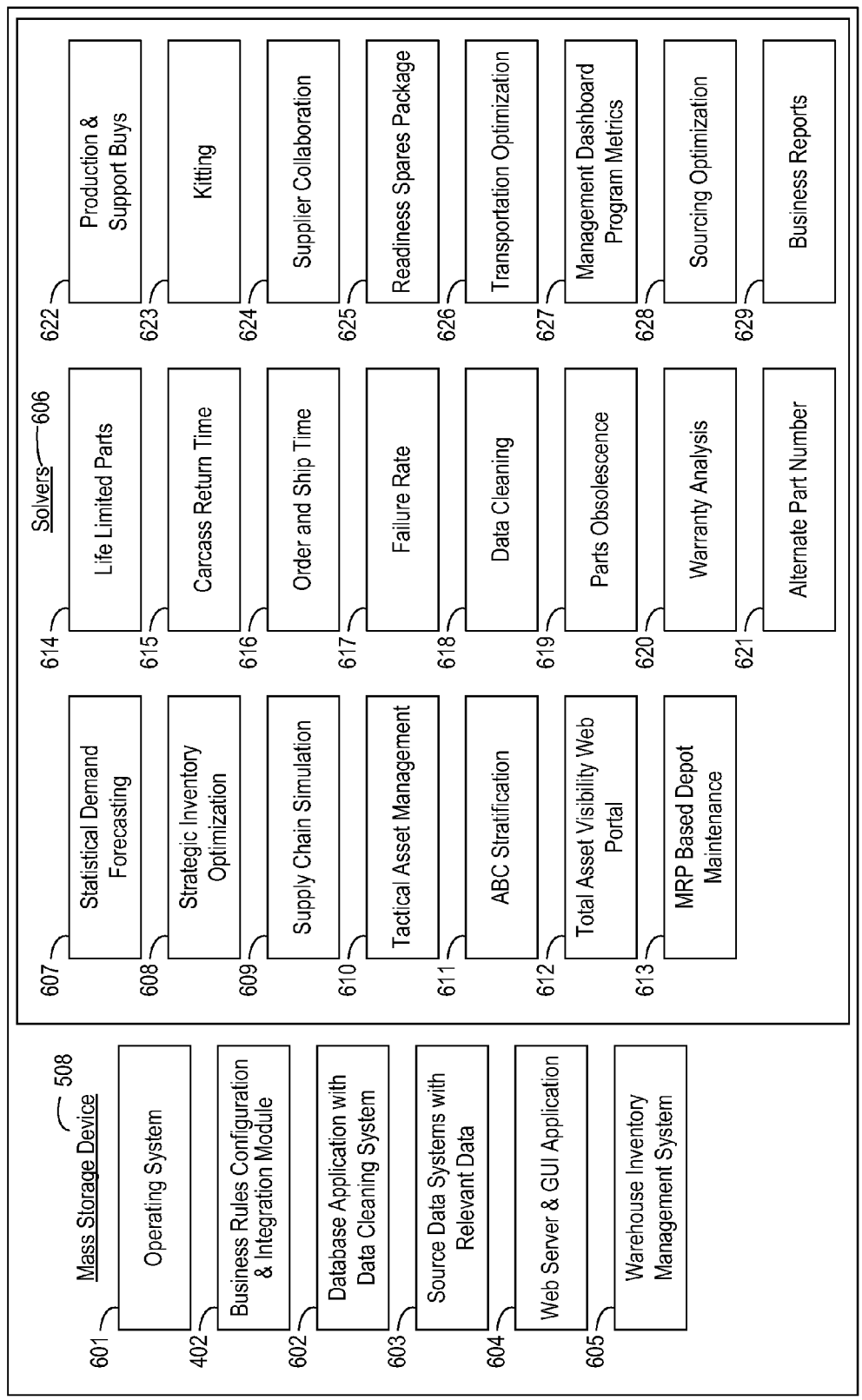
FIG. 6 illustrates a computing system architecture, specifically applications residing on mass storage device, for enabling an supply chain integrated program product.

Also, as briefly described above, the Total Asset Visibility (TAV) Web Portal, shown in FIG. 6, is used to address the recognition that the data required to effectively manage assets varies by application, and that no one data repository structure can possibly store all information all asset managers would ever need to view. Thus, the BRC and integration module, shown in FIG. 4 uses web technology to present business information from internal, customer, and supplier data systems to an asset manager, in one location and with one web sign on, in order to streamline the business process of managing assets. This technology allows a customer's existing systems to be incorporated into the supply chain management business process through a consistent web interface, without duplicating functionality or data. Additional details regarding managing an equipment maintenance supply chain will be described below with respect to FIG. 3.

Figure 3:
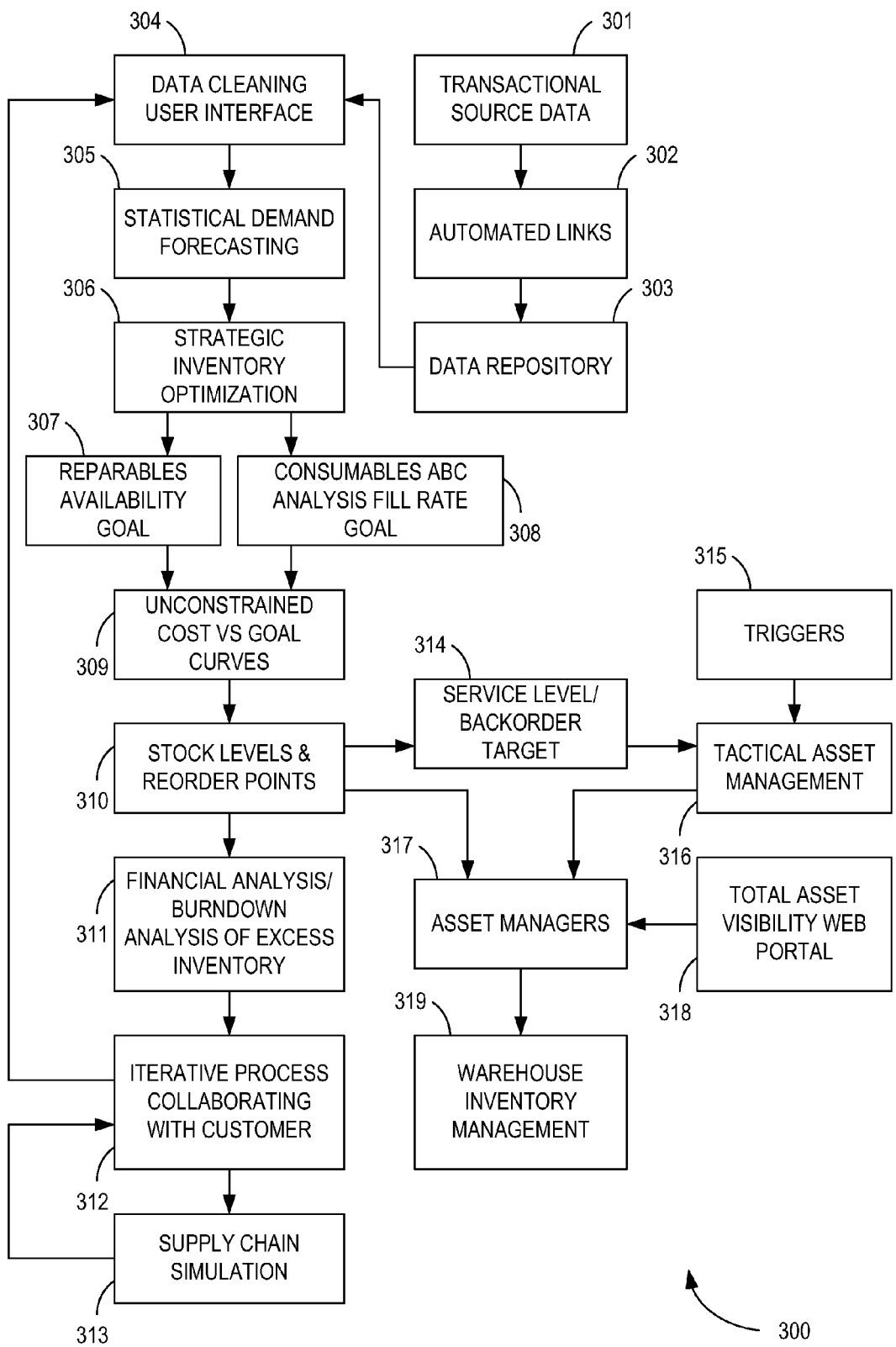
FIG. 3 illustrates an integrated and collaborative supply chain management business process.

FIG. 3 illustrates computing system architecture operations 300 for enabling an integrated and collaborative supply chain management business process in an illustrative embodiment of the invention. By way of example, and not limitation, salient points may include the following process steps, which may be embedded within the computing system architecture.

Automated links 302 to transactional source data 301 ensure data currency, and eliminate data being lost or truncated during manual pulls. This data 301 is often collected in batch mode, where information from different sources is collected in a data repository 303 for analysis. Data cleaning 304 is an iterative process. Some errors, such as invalid part numbers or Nato Stock Numbers (NSNs), can be identified when the data is loaded by comparing against a master parts list. Most other errors do not become obvious until the strategic spares forecast is run and the high driver parts are analyzed.

Statistical demand forecasting 305 applies a collection of statistical techniques for high and low demand forecasting to identify the best prediction of future demand. A strategic inventory optimization model 306 optimizes the spares inventory level to provide maximum aircraft availability for repairable parts 307, and maximum fill rate for consumable parts 308, at the minimum cost. Because some parts are spared at different levels than others, they have difference service level, or backorder, targets 314. The expected backorder targets 314 are the annual number of backorders based on the stock level 310, and are a measure of safety stock, or lack thereof. Uncertainty in demand and limited spares budgets ensure that some parts will not be on the shelf when requested—the function of the strategic model can be said to be to determine which parts one is most willing to run out of. This backorder target 314 is the heart of an effective supply chain, because it ensures that the optimized strategic spares forecast 105 done by an expert analyst and considering all parts, will be in concert with the tactical, part at a time forecast 316 performed by asset managers who are responding to the vagaries of the real world. The backorder target 314 establishes the desired safety stock in the tactical tools when calculating stock levels 310.

Consumables 308 are spared separately from repairables 307 because it is not practical to build the maintenance indenture level structure required to forecast them together with repairables. Consumables, like washers, rivets, and bolts are known as pan stock, and are often spared to a very high fill rate goal. Simply put, there is no reason ever to run out of these low dollar parts. An ABC analysis 308 is performed to separate consumables in to A parts, which are the 5% of parts responsible for 80% of annual sales, B parts which are the 15% of parts responsible for the next 15% of annual sales, and C parts which are the remaining 80% of parts responsible for the remaining 5% of sales. Stratifying parts demand in this manner avoids the problem of buying only high demand, low dollar parts to meet the fill rate goal and shorting everything else.

If the maintenance indenture level data for repairable parts is available, it is advantageous to spare both repairables and maintenance significant consumables (which, for example can keep an aircraft out of service if not replaced) together 307 to an availability goal. Including criticality of the part to the aircraft will also improve the fidelity of the forecast, by sparing critical items more heavily.

The unconstrained cost versus goal curve 309, or exchange curve, is used to identify the "knee" of the availability curve for repairables, or fill rate curve for consumables, to identify the biggest return for limited spares dollars. As the availability or fill rate goals approach 100%, cost increases many fold. This curve is an excellent tool for use in explaining the relationship between the cost of stocking at different inventory levels, and the resulting spares target which can be achieved.

Once a specific dollar investment is identified, the strategic spares model is employed to identify the optimal mix of parts, by part number, by location. This results in a list of recommended stock levels 310 for repairables, and stock levels and reorder points 319 for consumables. The stock levels and reorder points for consumables are developed using a modification of the classical Wilson Economic Order Quantity (EOQ) model which includes a safety stock to cover for variability in the demand which occurs during lead time, which is based on the backorder target (the average number of backorders per period) determined during the strategic optimization process.

Knowing the stock levels, demand rates, and part costs, as well as the cost of placing an order, the annual order cost and annual holding cost are determined. During proposal analysis, the contracts and pricing group will escalate costs for out-year parts requirements, account for scrap loss and rework, and add in corporate profit. This financial analysis 311 determines the spares portion of the contract price.

Another fallout of the optimization process, on existing programs, is that the current stock position (the inventory on hand, plus due-in, minus backorders) invariably contains the wrong mix of parts. This presents the opportunity to perform a multi-year burn down analysis 311 to: (1) gauge the required additional spares to "plus up" the system to the desired starting inventory, (2) burn down existing excess assets to the recommended stock level, (3) identify non-moving parts, which do not have active demand, as candidates for resale or disposal, and (4) perform a multi-year financial analysis to price the condemnation, or attrition, repairables and the consumables required to support a spares contract, given that the customer can take credit for excess inventory until the reorder point is reached.

Spares forecasting is an iterative process 312. If the resulting financial analysis is above the target cost of a proposal, or higher than a customer is comfortable with, then the forecast must be revised for a lower goal. Alternately, if the customer has additional funds available, the goal can be increased to identify the additional spares, which will provide the maximum increase in performance for the system. Experience indicates that most data cleaning is done using the results of the spares forecast by analyzing the high driver parts, which account for the largest amount of annual sales. By rank ordering parts based on annual sales, a natural cut off point usually becomes self evident and a manageable list of parts may be selected for review by logistics, provisioning, engineering, and customer experts. The largest errors are usually relatively apparent to the experts who know the parts, and often involve incorrect pricing, lead times, and condemnation rates. Demand is often incorrect due to supply systems, which do not distinguish between a request to utilize a piece of support equipment and an order to purchase a replacement piece. Once time modifications are often seen as recurring demand and must be factored appropriately. Miscoded part numbers must be corrected. It usually requires several iterations before the forecast comes in line, for example, when the differences in the cost of initial spares from one iteration to the next become acceptably closed such that a choice not to fund any additional iterations is made.

Collaborating 312 on the statistical demand forecast 305 with the reliability department, on pricing and lead time updates with contracts and pricing, and on demand rates and inventory levels with the customer, closes the data loop by ensuring that all disciplines make decisions using the same known good data, from the spares modelers, to the asset managers, to the cost analysts, to the engineers who design and improve the aircraft, to the managers reviewing high driver reports.

While strategic inventory optimization 306 optimizes, supply chain simulation modeling 313 analyzes. Simulation modeling 313 is used, in one embodiment, to understand the impact of a specific spares forecast upon an operational fleet of aircraft which are attempting to meet a flight schedule. Strategic forecasting will estimate the fleet availability achieved with a given spares forecast, unlimited numbers of maintainers, and aircraft which do not randomly move from base to base. Simulation modeling adds in the impact of random failures upon the supply network for aircraft flying missions at multiple bases, with maintainers who go on and off shift. Simulation modeling also can evaluate the impact of cannibalization, or robbing, upon fleet availability. Simulation modeling, when performed in sufficient detail, can provide an excellent indication of the operational availability which will be achieved in the field with a given support concept. Simulation modeling also allows trade-offs between different support concepts (e.g., two versus three levels of maintenance) and maintenance policies (e.g., lateral transfer of parts, or expediting) to be evaluated. Simulation modeling, like strategic forecasting, is an iterative process.

Once approved by the cognizant asset managers 317, the stock levels recommended by the strategic inventory optimization 306 are loaded into the order execution and inventory management system 319. This system manages repairables to a stock level, buying a new part when one is condemned. The stock level falls, and manages consumables to a stock level and reorder point, placing an order when stock falls to or below the reorder point in a reorder quantity which replenishes stock to the stock level.

Tactical decision support tools 316 allow asset managers to evaluate parts, one at a time. A tactical analysis is usually indicated by a trigger 315 (e.g., a stock out, sudden surge in demand, for example, a call from the fleet requesting additional stock from OEM inventory) which brings a specific part to the asset manager's attention.

The total asset visibility web portal 318 is a collection of convenient web screens which bridge the gap between the currency and level of detail of data in the data repository, the real time inventory levels at different customer retail and Boeing wholesale stocking locations, and the progress of repairable parts through the repair process. The TAV screens also allow visibility to the status of parts on order. In addition, they collect configuration information from multiple sources to identify alternate and substitute parts, and ensure that the asset manager is always ordering the latest configuration.

Figure 4:
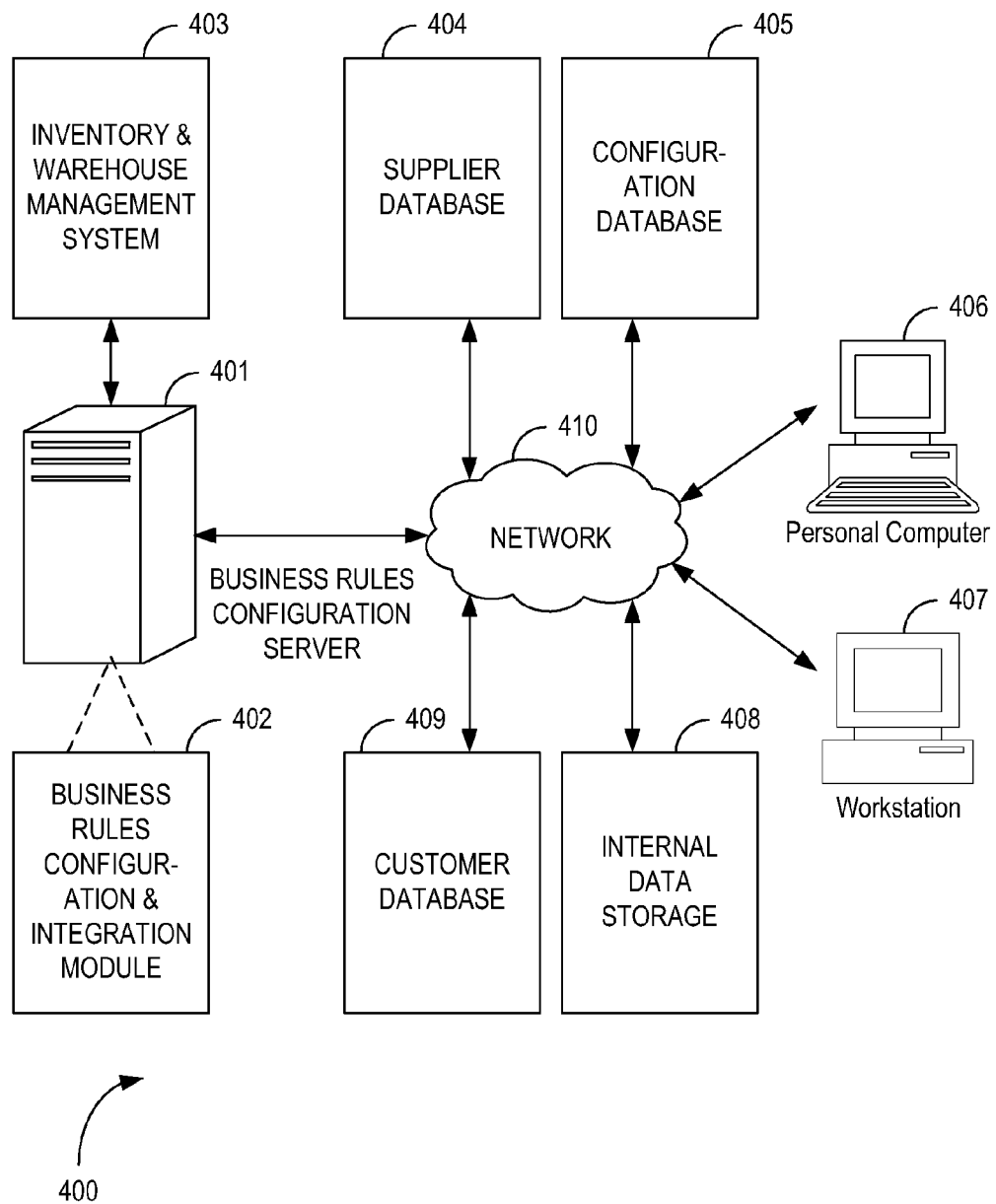
FIG. 4 is a schematic diagram illustrating various components of a networked operating environment utilized in the supply chain management business process of FIG. 3.

Referring now to FIG. 4, a schematic diagram illustrating aspects of a networked operating environment 400 utilized in an illustrative embodiment of the invention will be described. As shown in FIG. 4, the networked environment 400 includes a business rules configuration (BRC) server 401 that includes a BRC and integration module 402. The BRC server 401 is accessible to personal computer (PC) 406 and/or a workstation 407 via a network 410, such as the Internet or an intranet. The networked environment 400 also includes an inventory and warehouse management system 403, a supplier database 404 for updating and receiving data associated with supply chain suppliers, a configuration database 405, a customer database 409 to monitor and update data associated with customers, and internal data storage 408.

Output of the BRC server 401 may serve as inputs to the supplier database 404, the inventory and warehouse database 403, and the customer database 409. For instance, the BRC server 401, based on planning or a statistical demand forecast, can generate stock level reorder points for a group of parts and transmit this data to the inventory and warehouse data system 403. The configuration database 405 interfaces with the BRC server 401 and provides some key data elements as inputs into the supply chain business process. The values of the key data elements are shared among the integrated systems in the supply chain business process.

Similarly, the customer database 409, for instance a customer's warehouse database, may include the number of parts on-hand and available directly from stock. This on-hand information may be retrieved by or fed into the BRC server 401 to be considered during the planning or statistical demand forecasting process. Considering how much is physically at the customer site ensures planning accuracy and helps avoid over and/or under stocking. The supplier database 404 provides information to the BRC server 401 regarding procurement lead times for parts. Lead times help determine how many parts to stock on a shelf. How long it actually takes to procure the delivery of parts or products factors into the optimization algorithms which determine the stock levels of spare parts on the shelf. The internal database 408 serves as a supply chain management spare part and/or production data warehouse. This data repository contains relevant data associated with parameters internal to the supply chain manager that can be retrieved and invoked into the process. The data is prepared or "cleaned" before being invoked into the process. Additional details regarding data cleaning will be described below with respect to FIG. 6.

Figure 5:
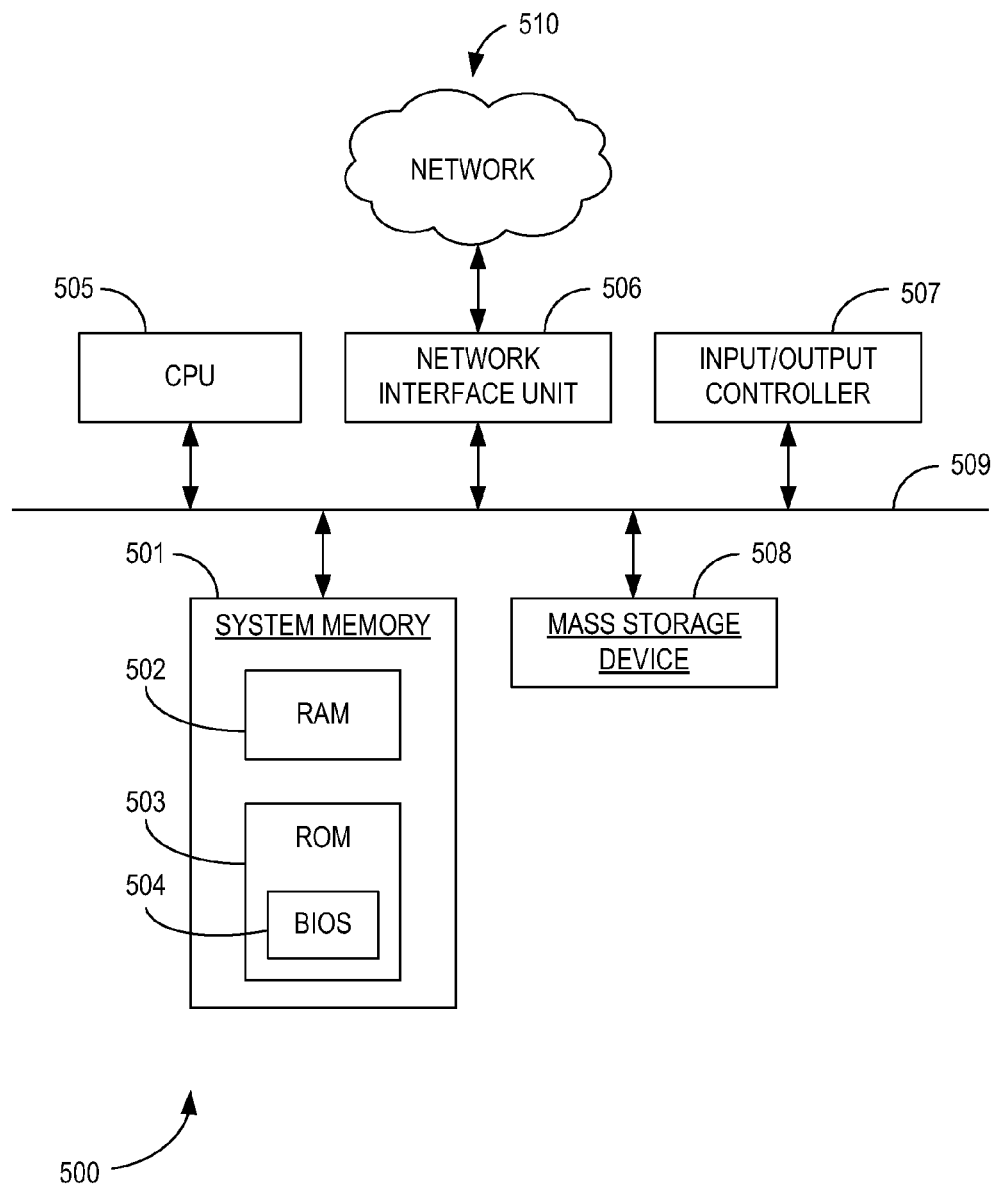
FIG. 5 illustrates computing system architecture for a business rules configuration server computer.

FIG. 5 illustrates computing system architecture for enabling an integrated supply chain management business process in an illustrative embodiment of the invention. The architecture includes a networked computer server 500 that is accessible to personal computer (PC) 406 (FIG. 4) and/or a workstation 407 (FIG. 4) shown) via a network 510, such as the Internet or intranet.

The networked computer server 500 includes a central processing unit (CPU) 505, a system memory 501, and a system bus 509 that couples the system memory 501 to the CPU 505. The system memory 501 includes read-only memory (ROM) 503 and random access memory (RAM) 502. A basic input/output system 504 (BIOS), containing the basic routines that help to transfer information between elements within the networked computer server 500, such as during start-up, is stored in ROM 503.

It should be appreciated that a Mass Storage Device (MSD) 508 may be a redundant array of inexpensive discs (RAID) system for storing data. The MSD 508 is connected to the CPU 505 through a mass storage controller (not shown) connected to the system bus 509. The MSD 508 and its associated computer-readable media, provide non-volatile storage for the networked computer server 500. Although the description of computer-readable media contained herein refers to a mass storage device, such as a hard disk or RAID array, it should be appreciated by those skilled in the art that computer-readable media can be any available media that can be accessed by the CPU 505.

The CPU 505 may employ various operations, discussed in more detail below, to provide and utilize the signals propagated between the networked computer server 500 and networked applications. The CPU 505 may store data to and access data from MSD 508. Data is transferred to and received from the MSD 508 through the system bus 509. The CPU 505 may be a general-purpose computer processor. Furthermore as mentioned below, the CPU 505, in addition to being a general-purpose programmable processor, may be firmware, hard-wired logic, analog circuitry, other special purpose circuitry, or any combination thereof.

According to various embodiments, the networked computer server 500 operates in a networked environment, such as shown in FIG. 2, using logical connections to remote computing devices (not shown) via network communication, such as an Intranet, or a local area network (LAN). The networked computer server 500 may connect to the network 510 via a network interface unit 506. It should be appreciated that the network interface unit 506 may also be utilized to connect to other types of networks and remote computer systems. The networked computer server 500 may also include an input/output controller 507 for receiving and processing input from a number of other devices, including a keyboard, mouse, or electronic stylus (not shown). Similarly, an input/output controller 507 may provide output to a printer, or other type of output device. The input/output controller 507 may also receive input via other input devices.

A computing system, such as the networked computer server 500, typically includes at least some form of computer-readable media. Computer readable media can be any available media that can be accessed by the networked computer server 500. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, disk drives, a collection of disk drives, flash memory, other memory technology or any other medium that can be used to store the desired information and that can be accessed by the networked computer server 500.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The networked computer server 500 further includes a mass storage device (MSD) 508, the purpose of which will be described in detail in FIG. 6.

FIG. 6. illustrates that the BRC server 401 (FIG. 4) further includes a mass storage device (MSD) 508 for storing an operating system 601 such as WINDOWS XP, from MICROSOFT CORPORATION of Redmond, Wash. The BRC and integration module 402 for integrating multiple systems or individual application sometimes referred to herein as "solvers" 606 is associated with managing the equipment maintenance supply chain, and a web server application for providing supply chain web pages over the network 510 (FIG. 5). The BRC and integration module 402 synchronizes the sequence and use of the solvers 606, also referred to as Supply Chain Management (SCM) software tools and specifies the exchange of information between these software tools.

Solving different inventory problems require different solutions, or solvers. The Business Rules Configuration (BRC) and integration module 402 determines and specifies the best solver to use depending on the characteristics of the inventory problem. In addition, module 402 is operable to handle any necessary preprocessing of data, and integrate the results into the business process after the solver complete processing of relevant data. The use of BRC module 402 enables the solvers to interoperate effectively, as well as configure the overall business solution to meet the requirements of the supply chain problem.

FIG. 6 illustrates the solvers 606 which may include one or more of a database application with a data cleaning system 602, such as SQL SERVER from MICROSOFT CORPORATION or ORACLE from ORACLE CORPORATION, a web server and graphical user interface application 604, such as EXCEL from MICROSOFT CORPORATION, and a commercially available statistical demand forecast application 607, such as FORECAST PRO from BUSINESS FORECAST SYSTEMS, INC. The solvers 606 also include a strategic inventory optimizer 608, a supply chain simulation 609, and relevant data from the source data systems 603. By examining one part at a time in the tactical asset management solver 610, the BRC and integration module 402 eliminates constraints on the number of uses of this tactical tool, because there is no interaction between parts, and companies managing assets traditionally have only one person responsible for a given asset. By tying the strategic inventory optimizer 608 to the one part-at-a-time tactical asset management tool 610 through the definition of safety stock, the BRC and integration module 402 keeps both software tools in synch, eliminating the need to re-optimize the entire network.

The BRC and integration module 402 automates collection and entry of data, based on a database containing the relevant data from the source data systems 603 for each part number being managed and adds a graphical representation of inventory levels over time, providing the same data but in a visual context.

The BRC and integration module 402 also extends through a Total Asset Visibility (TAV) web portal 612, that effectively extends the supply chain business process to include the functionality of external systems (such as logistics information systems containing part configuration, or customer inventory management systems containing quantities of service parts, etc.) without having to duplicate this data on the internal web server and GUI application 604 or the database application with data cleaning 602. The BRC and integration module 402, specifies what functions must be performed in what order in order to achieve optimal results, without restricting a practitioner to a specific software tool or combination of software tools. The BRC server 401 incorporates a spares modeling process, developed based on best practices culled from both proposal spares analysis and recurring spares analysis, enabling the spares process for use across industries.

Other features of the BRC server 401 include a statistical demand forecasting process model via the statistical demand forecasting application 607, which links knowledge of parts with automated selection of statistical algorithms. Specifically, a Poisson distribution does not adequately characterize demand for aerospace service parts. Aerospace service parts may be adequately modeled using a combination of the negative binomial, Poisson, and exponential distributions.

A equipment operational availability (Ao) solver 608, sometimes referred to as a strategic inventory optimization model, calculates the supply availability of parts not managed under an equipment maintenance contract. This solves the problem that companies operating equipment typically contract maintenance of engines to the engine manufacturer, and may contract maintenance of certain electronics such as radar equipment to the radar manufacturer, and contract the remainder of the parts to a third party supply chain maintenance provider. The third party provider is typically contracted to manage spares to maintain a certain equipment availability goal. The problem is that some maintenance, such as engines and radars, is not under the control of the third party provider. The equipment operational availability (Ao) solver 608 determines a ratio for the expected availability of the end item, or equipment, from each system being maintained by a different maintenance provider. This enables the third party provider to determine the appropriate operational availability goal for the systems under their control, factoring in other systems not under their control, in order to achieve an overall operational availability goal. The resulting goal may then, but is not required to be, warranted.

The BRC and integration module 402 also allows what-if analysis via the supply chain simulation 609 thus, enabling an asset manager to save and review multiple scenarios before selecting one to implement and electronically loads the resulting stock level and reorder point into the warehouse inventory management system 605.

Tactical asset management solver 610, performs a part-at-a-time analysis, to do "what if" analysis, and further include the ability to perform one or more of: save scenarios, commit saved or unsaved scenarios to the production database and therefore update stock level requirements, discard saved or unsaved scenarios, and identify the creator of the scenarios.

An extension of the above tactical analysis solver 610 includes business rules to mitigate risk of unanticipated demand through innovative contracting and manufacturing and repair solutions. Unanticipated demand occurs when a part experiences no demand over several years, causing it not to be stocked, and then experiences demand. Alternately, unanticipated demand may be demand in excess of that predicted by the Statistical Demand Forecasting solver 607.

The business rules to mitigate against this problem include, but are not limited to, evaluating one or more of the following options: implementing flexible contracts with suppliers to minimize administrative delay time, paying maintainers or depot repair facilities overtime to repair parts more quickly, repairing parts which would normally be scrapped, and fabricating parts locally, at a local machine shop, rather than waiting for the vendor to manufacture additional parts. Reverse engineering of parts using rapid manufacturing techniques may be implemented, such as but not limited to, Selective Laser Sintering (SLS), stereolithography (STL), Fused Deposition Modeling (FDM), Computer Numeric Control (CNC) machining. Finally, another business rule includes contracting with repair depots for repair of like parts, not specific part numbers, and cannibalizing parts from another end item of equipment.

The extension of the above tactical analysis solver 610 to include business rules to enable asset managers to understand the impact of utilizing parts intended for the manufacture of new end items as maintenance spares. Robbing parts from production impacts a manufacturer's ability to build equipment can disrupt production schedules, particularly when parts must be assembled in a particular sequence. This solves the problem that customers view a needed spare, which is keeping equipment from operating, not as a part robbed from production but as a product that cannot meet its mission. This solver evaluates the business benefit of whether to rob production to replace at all.

An ABC stratification solver 611, also known as an ABCDE Solver, a Pareto Analysis Solver, or a Part Stratification Solver includes a report listing and/or graphing consumable parts optimized to a fill rate goal by the strategic inventory optimization model. This solver stratifies consumables into categories. Each category is optimized individually to achieve a fill rate. This avoids skewing the collective forecast towards low dollar, high volume parts. This technique also identifies the parts that require the greatest dollar investment and asset management attention. This report graphs the line count on the X axis against the cost of annual consumption on the Y axis, where a line is a unique part number. There may be zero or more parts inventoried for each unique line. This solves the problem identified in a recent Government Accounting Office (GAO) assessment that a weakness in current Air Force modeling is that their current model has a bias for low cost/high demand parts over high cost/low demand parts. Boeing's modeling approach avoids this problem by grouping lines of unique part numbers into forecasting and management purposes. It will be appreciated by practitioners of the art that the use of specific percentages and dollar values to segregate groups is arbitrary and not intended to limit the possible combinations of groupings.

Groupings include two or more of, but are not limited to, the following categories. A parts are responsible for the top 80% of annual consumption, B parts are responsible for the next 80-95% of annual consumption, C parts are responsible for the last 5% of annual consumption, D parts are priced from $25.00 to over $1.00, E parts are priced from $1.00 to $0.01, Z parts have demand, but no price (zero price parts). These parts are run without optimization to a uniform fill rate. No Demand parts do not have demand history. The No Demand parts are not spared, because they are not expected to fail.

A Total Asset Visibility (TAV) Web Portal 612 addresses the recognition that the data required to effectively manage assets varies by application, and that no one data repository structure can possibly store all information all asset managers would ever need to view. Supply chain service providers use web technology to present business information from internal, customer, and supplier data systems to an asset manager, in one location and with one web sign on, in order to streamline the business process of managing assets. This technology allows a customer's existing systems to be incorporated into a supplier's business process, through a consistent web interface, without duplicating functionality or data.

A Manufacturing Requirements Planning (MRP) based depot maintenance solver 613 is also provided. In depot maintenance of repairable parts, piece parts usage is often well established and follows a MRP model, not an unscheduled (random) demand model. This is particularly true when the repairable part is overhauled, and a certain number of consumable components such as gaskets, wear plates, nuts and bolts, cover plates, connectors, etc. are replaced regardless of the depth of repair necessary. A traditional inventory optimization model will stock many piece parts to a high fill rate, but by nature of the optimization algorithm assumes some variability of demand and that some parts should be traded off against others, instead of stocking all parts necessary for repair.

A life limited parts solver 614 determines whether components with a shelf life, such as but not limited to gaskets, washers, o-rings, shielded mild detonating cord (SMDC), specialty lubricants, and batteries should have their stock levels and reorder points (or alternately, reorder points and reorder quantities, where stock level is the sum of the reorder point and the reorder quantity) adjusted. The life limited parts solver is typically exercised, but not required to be exercised, after the strategic inventory optimization solver, and typically analyses parts one at a time.

Life limited parts solver 614 may also be utilized to determine stock level requirements for parts with a scheduled removal rate, such as every 1,000 or other operating hours.

A carcass return time solver 615 ratios the time to return repairable spare parts from a main operating location to a depot maintenance facility, which is normally a shorter time, to the time to return repairable spare parts from a forward operating location to a depot maintenance facility, which is normally a longer time. The return times, known by practitioners in the art as retrograde time, are ratioed based upon the percentage of parts returned from each location by part number. This enables the strategic inventory optimization model to use a single carcass return time for each part number.

An order and ship time solver 616 is provided to determine a ratio of the time to ship an operational repairable spare part from a stocking locating to a main operating location, which is normally a shorter time, to the time to ship an operational repairable spare part from a stocking location to a forward operating location, which is normally a longer time. The order and ship times are ratioed based upon the percentage of parts shipped to each location by part number. This enables the strategic inventory optimization model to use a single order and ship time for each part number.

A failure rate solver 617 is utilized to ratio different part failure rates, based upon the percentage of the time the part operates in each mode. For example, an aircraft missile has three failure rates: the operating hours on the aircraft while the missile is armed and live, the operating hours on the aircraft while the missile is on standby on a rack, and the shelf life while the missile is in a bunker, also known by practitioners in the art as infant mortality rate.

In another example of a failure rate solver 617, a piece of test equipment used to troubleshoot failed pieces of equipment, or failed parts, has three failure rates, the operating hours while the test equipment is turned on, the number of power on cycles where the test equipment is turned on, and the shelf life while the test equipment is in storage. The failure rate solver 617 enables the strategic inventory optimization model 608 to use a single demand rate for each part number.

A data cleaning solver 618 collects, formats, and analyzes data for discrepancies both before going into a specific solver, and after analysis by the solver. The data cleaning solver 618 functions are not limited to, but include one or more of the following: normalize data to a common unit of measure (quantity) or common currency (pricing escalated to current year US dollars), determine the best data source when conflicting values of the same data element are available from different source systems, pass data from one solver to another, provide defaults for missing supply chain data, and evaluate "outlier" parts which have unusually high (or unusually low or missing) demand, lead time, price, condemnation rate, repair cycle time, not repairable this station (NRTS) rate, procurement lead time, annual buy, or other supply chain attributes. A practitioner in the art will also know this evaluation as a high driver report, driver report, or missing data report.

Other data cleaning solver 618 functions include: maintaining an audit trail of source systems, changes made to clean data (by who and when), and date the data element last changed, and enabling data cleaning to be performed between solvers, without requiring all solvers to be exercised again, which solves the problem that some data errors do not come to light until a stock level is recommended, or until a solver is operated that requires a specific data element as an input value.

Data cleaning solver 618 performs closed-loop data cleaning, whereby updates to data in one solver are propagated to the production database and to all other solvers. This solves the problem of different organizations performing supply chain analysis on the same part number, but with different logistics data. In one embodiment, decisions are based upon the same cleansed values for each data element.

A parts obsolescence solver 619 is configured to determine lifetime buy requirements for parts which are going out of production, or that contain piece parts which have, or are likely to go out of production, or to determine requirements for the number of parts to cannibalize when equipment is phased out and disposed of.

In one specific embodiment, parts obsolescence solver 619 is utilized solely to determine lifetime buy requirements for parts. In addition to obsolescence issues, reasons to make a lifetime buy of parts include costly tooling requirements, to procure spare parts at the same time the production of the end item of equipment takes place, because the manufacturer is shutting down a production line, because the cost of storing tooling required to manufacture the parts is deemed not warranted, and other reasons.

A warranty analysis solver 620 determines an equipment manufacturer's, or an equipment maintainer's, actual cost of repairs when parts are covered under an OEM warranty. The ability of the warranty analysis solver to price repairs over time when new equipment is continuously being added or phased out of the fleet being maintained. An extension to the warranty analysis solver 620 allows pricing of repairs during proposals for performing supply chain management of equipment.

An alternate part number solver 621, evaluates supercession, substitution, and interchangeability rules. Supersession is when the design of a part number is revised to a new part number. Substitution is when one part number may be substituted for the preferred part number. Interchangeability is when on part number may be replaced by another without impacting form, fit, or function; interchangeability may be one way, two way, or non-interchangeable between and older and a newer configuration. The alternate part number solver 621 normally operates after the statistical demand forecast solver, and before the before the strategic inventory optimization solver, to aggregate demand to the most current part number revision. The alternate part number solver 621 also aggregates inventory of alternate part numbers together so that the decision to procure additional inventory of the most current part number revisions considers the availability of alternatives that exist. The alternate part number solver also works with the tactical analysis solver to provide the asset manager with options to fulfill a requirement for parts with the primary, or most desirable part number, is not available.

A production and support buy solver 622 synchronizes the purchase of parts to support the manufacturing of equipment with the purchase of parts used as spares. This solves the problem that a manufacturing company traditionally focuses on, for example, getting aircraft and missiles out the production door. A Manufacturing Resource Planning (MRP) system is employed to ensure that individual parts are procured, or that manufacturing starts, lead time away, according to a fixed production schedule. Spare parts for the repair of delivered equipment are treated separately from parts on the shop floor meant for production. Spares buys are often made separately from long term production buys. This solver integrates production and support requirements, enabling the purchasing department to lower costs by making larger combined buys.

A kitting solver 623 is utilized to create a kit of the most commonly used repair parts used when performing maintenance on repairable parts. These kits may include, but are not limited to, lubricants, gaskets, nuts, bolts, attaching hardware, wear plates, knobs, wear items, and life limited items. These kits may be used at the operating location and/or the depot repair facility, and may differ depending upon the depth of repair being performed.

A supplier collaboration solver 624 shares statistical demand forecasts with suppliers, enabling suppliers to anticipate likely orders for the coming year, in order to reserve manufacturing capacity and better plan production and repair schedules. In addition, this solver shares but is not limited to: sharing the logistics data that resulted in the statistical demand forecast, including write-ups for each maintenance action performed on a supplier's part, security measures limiting access of suppliers to the parts they manufacture, distribute, or repair, and sharing the logistics data that resulted in the stock level, including but not limited to supplier price, procurement lead time, condemnation rate for repairable parts, repair turnaround time, retrograde shipping time from the time a part fails to when it reaches the supplier for repair, and location of parts in the logistics pipeline or in warehouses or in other locations.

A readiness spares package (RSP) solver 625 is operable to determine the number of spare parts required to support equipment operated at a forward operating location, which is different from the main operating location where spares are normally stored. The RSP solver 625 determines requirements to support equipment for a period of time when re-supply is not possible. The RSP solver 625 also determines requirements for a standalone spares package of key repairable and consumable parts required to support equipment operations. Practitioners in the art also know this problem as War Readiness Spares Kits (WRSK), Priming Equipment Packages (PEPs), or the periodic re-supply problem. The RSP solver 625 solves an observed problem that this area has not been well supported by organic forecasting processes and offers an opportunity to demonstrate innovative thinking.

Steps performed by solver 625 include, but are not limited to, the following: use of the same logistics inputs as the strategic inventory optimization model and election of an operational scenario, which includes but is not limited to the expected equipment operating hours, which are annualized, so 100 operating hours per week per end item of equipment becomes 5,200 flight hours per year per end item of equipment, a time between re-supply, for example, one week RSP enabling the equipment to operate for a week would be seven (7) days between re-supply.

Another step performed by this solver 625 include a constraint, including but not limited to equipment availability, a space limitation based upon a maximum total volume of spares which can be transported, or a weight limitation based upon a maximum total weight of spares which can be transported.

Still other steps performed by this solver 625 include: invoking the strategic spares model for the new scenario to determine the RSP requirements, meeting with the customer to review recommendations, and invoking the supply chain simulation solver 609 to reduce risk and determine whether the deployed equipment can meet the operational goals and determine how frequently the equipment meets these goals.

Solver 625 is further configured to evaluate risk mitigation strategy to rapidly deploy emergency spares via extraordinary measures, such as a charter flight or courier, and use Radio Frequency Identification (RFID) tags on each spare parts to track carcasses on the return pipeline. This solves the problem that spares usually get to where they are going, but languish during retrograde, or return to the depot for maintenance. Speeding return from the deployment keeps the total pipeline spares requirements to a minimum. A practitioner in the art will appreciate that pipeline spares are those required to support equipment operations, the repair turnaround time, and the procurement delay time to acquire new spares.

The use of a transportation optimization solver 626 to coordinates the transportation of high value, and often low volume, spare parts from manufacturer to central warehouse to forward operating location, and return or retrograde transportation of failed repairable parts back to the repair depot. Benefits of transportation optimization include: lower transportation costs through collective buying power and freight pooling, increased efficiency through optimization software, Total Asset Visibility (TAV) during transportation through RFID and parts marking technology, better transportation decisions through analyzing part movement, improved cash flow resulting from better utilization of resources, and better strategic inventory optimization by collecting logistics information on transportation times, repair times, and demand patterns.

Management dashboard program metrics 627 allow tracking of supply chains at a top level, recording such metrics as inventory turns, inventory investment, return on investment, average number of days parts are on backorder, and additional metrics which enable management teams to monitor the health of a supply chain.

Including sourcing optimization 628 in a supply chain solution, which is a statement of who the suppliers are and how to best cultivate relationships with them is included within BRC server 401. Sourcing optimization 628, in one embodiment, recommends, but is not limited to, one or more of the following relationships: long term supplier relationships, stocking long lead time, limited availability, or hedging raw materials at the supplier's manufacturing facility for use by the supplier to manufacture parts in the event of an order with the purpose of reducing manufacturing lead time, storing tooling required to manufacture parts at the supplier's manufacturing facility. In addition, contracting for an annual quantity of manufacturing of a like process, while retaining flexibility to specify the mix of parts to be manufactured, in order to minimize stock levels of parts with uncertain or fluctuating demand is contemplated within sourcing optimization 628

Specific automated business reports 629, include, but are not limited to, a line count report listing and/or graphing the value of parts in inventory by category of part. Part categories include consumable parts optimized to a fill rate goal by the strategic inventory optimization model (which may comprise multiple subcategories), repairable parts optimized to an equipment availability goal by the strategic inventory optimization model (which may comprise multiple subcategories), and the parts excluded from optimization (which may comprise multiple subcategories). Such a report answers the question of why is the total value of the parts optimized less than the total value of inventory.

Inventory excess and shortfall report showing current inventory, the excess inventory available for resale or disposal, and the shortfall which is below recommended stock level.

The use of a combined exchange curve, also known by practitioners in the art as a cost versus goal curve, which combines two or more exchange curves at the operating location (retail level) and warehousing (wholesale level); and/or combines repairable parts optimized to an equipment availability goal and consumable parts optimized to a fill rate goal; and/or combines consumable parts optimized in separate categories.

Optimal inventory level listing and/or graph depicting current inventory by category, where category is comprised of active parts required to achieve optimal stock levels recommended by the strategic inventory optimization model, inactive parts with no history of recent demand to indicate that they should be stocked, excess parts which will not be used within some variable number of years, and the excess parts what will be burned down or utilized within the same variable number of years through consumption.

One embodiment includes a listing and/or graph of the active parts required to achieve optimal stock levels recommended by the strategic inventory optimization model plus the required one time additional provisioning or stocking required to bring inventories to the optimal level to support the equipment. These two categories comprise the optimal level of active inventory.

Another embodiment includes a listing and/or graph of the inactive parts with no history of recent demand to indicate that they should be stocked, and excess parts which will not be used within some variable number of years. These two categories comprise the inactive and slow moving inventories which are candidates to be excessed or scrapped.

Another embodiment includes a listing and/or graph of the excess parts what will be burned down or utilized. Note the previous four listings and/or graph depict the transition from current stock levels or inventory levels to future, optimized stock levels or inventory levels.

Annual spares consumption listing and/or graph depicting burn down of excess inventory over time. Depicted graphically, this graphs shows calendar time on the X axis and annual consumption on the Y axis. Annual consumption is depicted in categories, such as on a bar chart, to include both required buys and excess inventory burned down over time. This chart answers the question, "if I have excess inventory, and I know how many parts I will consume each year, then how many parts do I actually need to buy each year?" This report shows how strategic inventory optimization may be used to lower inventory investment, and how the excess inventory may be consumed over time, thus reducing the budget for procurement of replacement spares to cover those consumed during repairs or scrapped as unserviceable.

Another embodiment includes annual spares and repairs buys listing and/or graph showing the expected annual cost to for procurement of replacement spares to cover consumables parts consumed during repairs, repairable parts scrapped as unserviceable, and the cost of repairs to repairable parts. This report answers the questions, "how much budget should I allocate for maintenance parts each year? What is the spares procurement budget? What is the repair budget for repairable parts? What is the expected annual buy and number of repairs by part number, so I can collaborate with my supplier by sharing our forecasts?"

Another embodiment includes a multi-year life cycle cost, or total ownership cost, report listing and/or graphing annual costs over one or more years and including the impact of one or more of: deployments of equipment from one location to another. Also included are the impact of an increase in utilization of equipment for a duration, or surge, of time, deployment of additional equipment on a periodic basis, such as during delivery of equipment, reduction of equipment on a periodic basis, such as during equipment phase out and disposal, and evaluation of engineering design changes impacting the reliability or maintainability of one part upon the entire system.

A procurable part report listing and/or graphing the part numbers and quantities of parts recommended by the strategic inventory optimization solver for use by those buying the parts. This solves the problem that in a manufacturing organization, a requirement to sell a spareable part may generate a requirement to procure the piece parts required to manufacture that spareable part. The procurable part report translates the requirements for spareable assemblies into a list of procurable parts, and aggregates requirements for part numbers which are procured both as piece parts and as component parts of An On Hand and On Order at Contract End report listing and/or graphing the part numbers and quantities on hand and on order at a point in time. This solves the problem that a company must know the amount of stock on hand and on order at the end of a contract period in order to price the termination liability due to a contract cancellation, or to a contract expiration.

A Financial Projections report and/or graph provides financial metrics. This solves the problem that different constituents have different requirements, specifically, spares analysts want to know the lowest cost mix of parts required to meet a goal, asset managers want to know how much of each part to buy, and managers want to know how much money they will be able to return to stakeholders.

Stock levels, demand rates, and part costs, as well as the cost of placing an order, the annual order cost and annual holding cost are determined. Costs for out-year parts requirements are adjusted to current year dollars, old pricing data is escalated to current year dollars, allowance is made for scrap loss and rework of manufactured parts, and corporate profit is added to part cost. This financial analysis determines the spare parts portion of a supply chain contract price.

Figure 7:
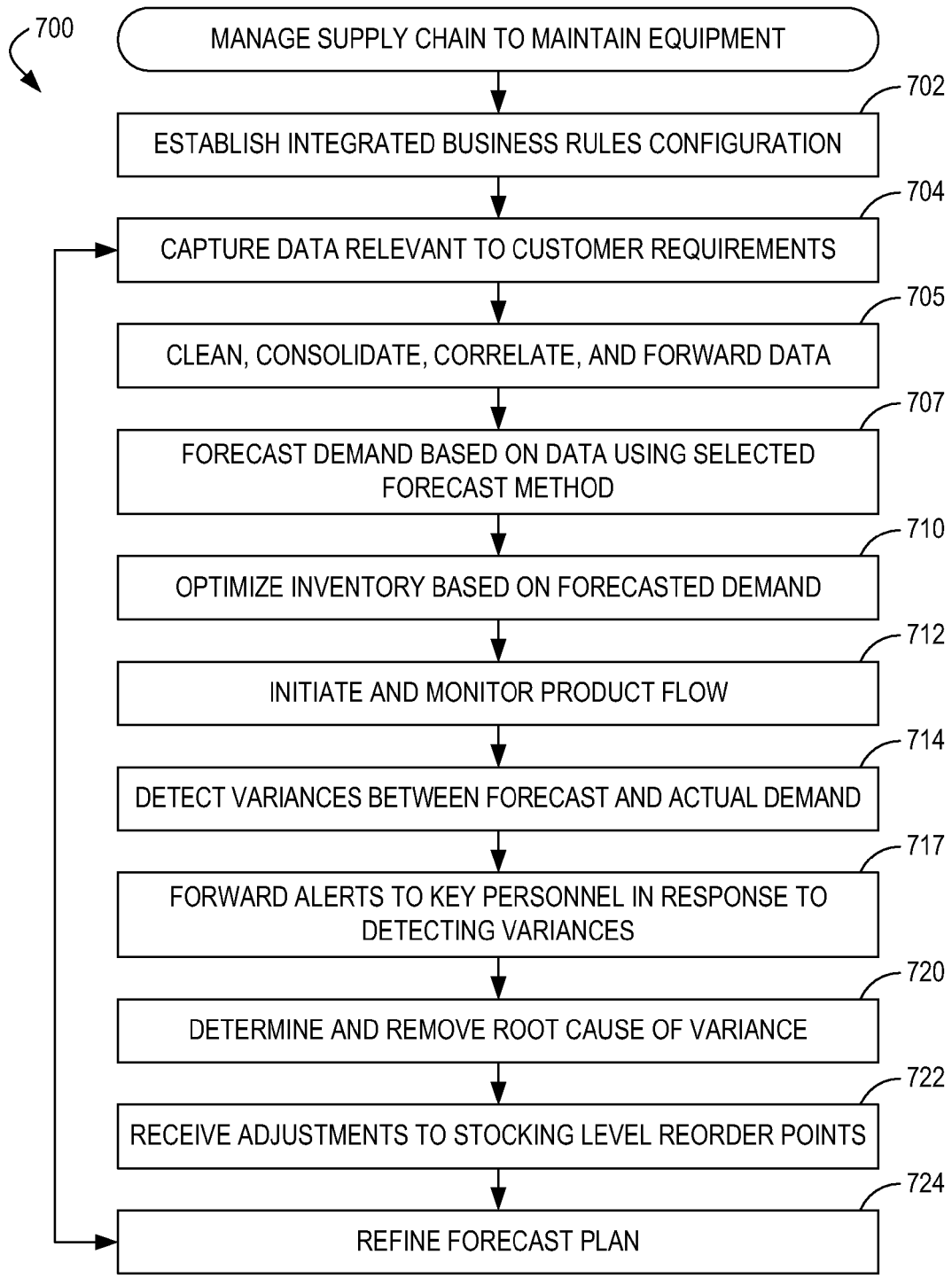
FIG. 7 illustrates an operational flow performed in managing a supply chain process to maintain equipment or assets.

Additional details regarding managing an equipment maintenance supply chain will be described below with respect to FIG. 7 which is an operational flow 700 performed in managing a supply chain process to maintain equipment or assets. FIG. 7. is illustrative of a routine or operational flow performed in managing a equipment maintenance supply chain process according to an illustrative embodiment of the invention. When reading the discussion of the routines presented herein, it should be appreciated that the logical operations of various embodiments of such modules are implemented (1) as a sequence of computer implemented acts or program modules running on a computing system and/or (2) as interconnected machine logic circuits or circuit modules within the computing system. The implementation is a matter of choice dependent on the performance requirements of the computing system implementing such modules. Accordingly, the logical operations illustrated in FIG. 7, and making up various embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope as set forth herein.

The operational flow 700 begins at operation 702 where the BRC server 702 establishes an integrated business rules configuration. Next at operation 704, the BRC module 402 (shown in FIG. 4) captures data that is relevant to customer requirements. Then, at operation 705, the BRC module 402 cleans, consolidates, and/or correlates the data in preparation for use by the solvers 606.

Next, at operation 707, the BRC module 402 forecasts demand using statistical analysis based on the prepared data. The BRC module 402 selects the forecasting methodology from a library of methods based on a forecasting profile of the equipment parts and how the parts are used. The operational flow 700 then continues to operation 710.

At operation 710, the BRC module 402 optimizes the inventory based on forecasted demand. This is where buy recommendations and suggested stocking levels and locations are generated. Next at operation 712, the BRC module 402 initiates and monitors the actual flow of spare parts associated with a customer in order to for the integrated solvers 606 (FIG. 6) to plan for replenishment of that product to the customer on an ongoing basis.

Next, at operation 714, the BRC module 402 detects any variances between the statistical demand forecast and the actual demand. Then at operation 717 the BRC module 402 forwards alerts to the cognizant asset manager in response to detecting variances which exceed a preset threshold. Alerts may be forwarded in the form of electronic messages to an inbox of a representative responsible for the customer account. The operational flow 700 then continues to operation 720.

At operation 720, the root cause of the variance is determined and removed. For instance, a problematic procurement lead time (PLT) in ordering spares may be the root cause of a detected variance. The PLT would likely be changed, after collaborating with the supplier, to remove the root cause. Then at operation 722, the BRC module 402 receives adjustments to the reorder points and reorder quantities in response to detecting the variance. Then the BRC module 402 continues in the closed loop at operation 724 by refining the forecast plan and returning to operation 704 described above.

Figure 8:
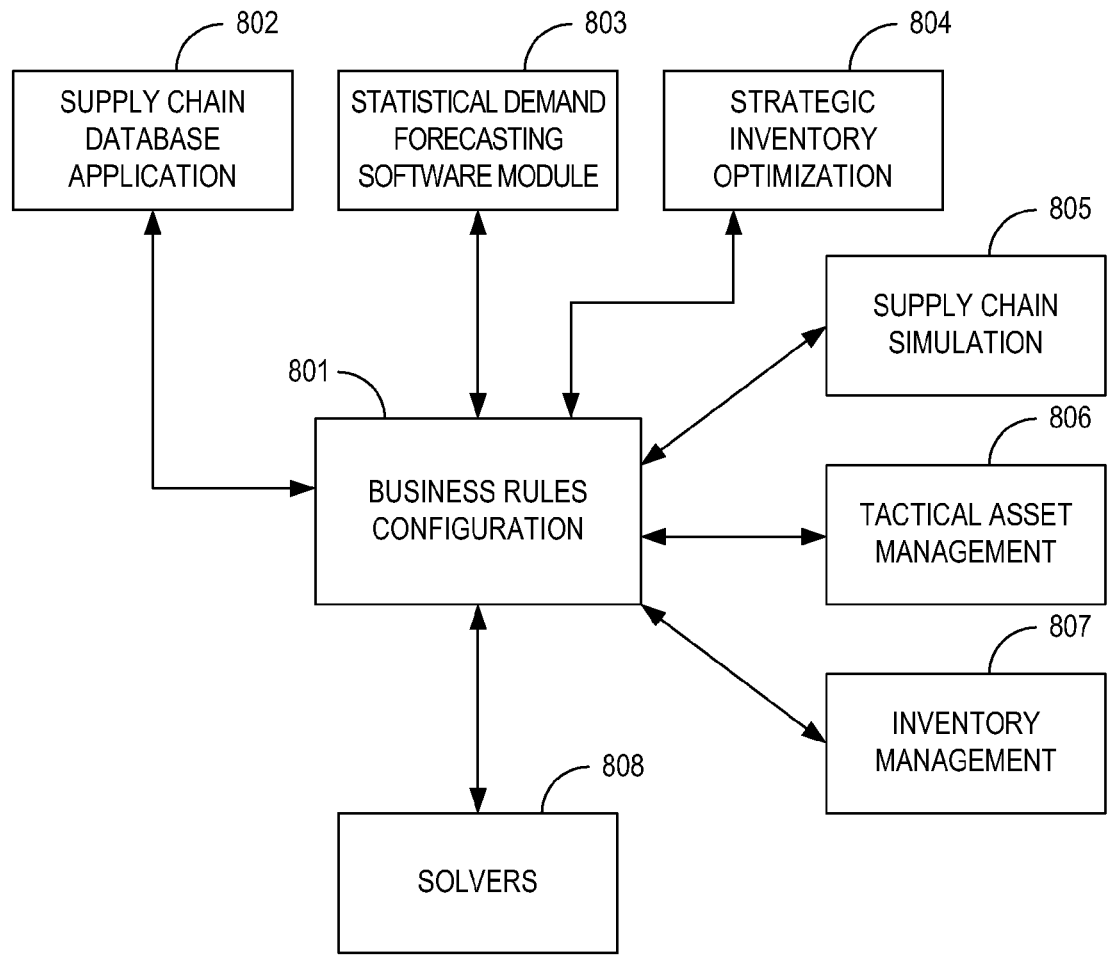
FIG. 8 is a block diagram illustrating supply chain software functions.

FIG. 8 illustrates the supply chain software functions, the novelty, and the outputs of the major modules which comprise the software. The architecture represents an innovation to the art, because of the way the software architecture maps the system requirements to the business process to a software solution that uses specific solvers to provide a tailored solution to a complex supply chain problem.

The BRC 801 was developed with an understanding of the business problems requiring supply chain solutions, evaluating the relationships between the business requirements and the specific solver required to address the requirements, decomposing the problem into solvable steps, identifying the system level requirements necessary to enable each step to be addressed with a solver, and integrating the overall solution in one architecture.

A Supply Chain Database Application 802 manages the flow of data from customer and supply chain service provider systems. These data come from multiple sources, and traceability is provided to the source of each data element in order to provide an auditable source of data. The data base application allows efficient use of existing legacy systems in a way that increases the usefulness of the data. The database application provides a source of data to perform investigation, research and analysis. The data is utilized to forecast, acquire, and allocate spares to support the equipment operating program at specified operating locations for equipment which the service provider manages.

A Statistical Demand Forecasting solver 803 links knowledge of parts with automated selection of statistical algorithms. Specifically, statistical analysis has indicated that the Poisson distribution does not adequately characterize demand for aerospace service parts and that aerospace service parts may be modeled with lower forecast error using a combination of the negative binomial, Poisson, and exponential distributions, with the Weibull distribution used for parts experiencing wear out. Analysis has also determined that parts may be grouped by functionality, such as but not limited to mechanical, hydraulic, electronics, landing gear, engines, equipment frame, and parts grouped by these functions may be assigned the appropriate distribution for statistical demand forecasting.

Including both statistical demand forecasting, which is a statement of what a customer orders, and sales forecasting, which is a statement of what the original equipment manufacturer (OEM) can deliver, constrained by capacity, inventory, and manpower, in a single supply chain solution. Note that sales forecasting is also known by practitioners as available to promise.

Utilizing the average number of annual backorders from strategic inventory optimization model 804 the safety stock for the part-at-a-time tactical asset management model is calculated. This keeps the theoretical strategic model, typically run yearly or quarterly, in synch with the tactical model, which is run daily to correct inventory imbalances in response to the vagaries of the real world.

Defining safety stock, which is excess inventory held to respond to uncertainty in demand, as the difference between the safety stock determined using an expected annual number of backorders stock level formula and the classical Wilson Economic Order Quantity (EOQ) stock level formula. The Wilson EOQ model, developed in the 1930's, assumes that when stock level hits zero, a new order arrives which was placed lead time away. The Wilson EOQ model assumes no variability of demand. This new safety stock formula classifies any stock level in excess (or shortage) of the Wilson EOQ model as safety stock. Safety stock may therefore be either a positive or negative, because during an inventory optimization, one may intentionally run out of more expense, low volume parts.

The use of simulation 805 to reduce risk by modeling the operational availability of operating equipment under different levels of equipment usage when the stock levels for repairable parts, and reorder points and reorder quantities for consumable parts, are set at the recommendations of the strategic inventory optimization model. Simulation 805 is further utilized to evaluate different business rules for tactical asset management, including one or more of, but not limited to, the following: policy for later transfer of parts from one forward stocking location to another, policy for later transfer of parts from one stocking warehouse to another, cannibalization of parts from one piece of equipment to another, and stocking policies related to spares deployment kits which travel with the equipment during deployments away from the main operating location.

Simulation 805 is further utilized to determine manpower utilization of maintainers repairing equipment at the operating location, manpower utilization of maintainers performing depot maintenance, parts utilization during depot maintenance (where parts usage is often well established and follows a Manufacturing Requirements Planning (MRP) model, not an unscheduled (random) demand model, deployments of equipment from one location to another, an increase in utilization of equipment for a duration, or surge, of time, and deployment of additional equipment on a periodic basis, such as during delivery of equipment.

In addition, simulation 805 is utilized for a reduction of equipment on a periodic basis, such as during equipment phase out and disposal, an evaluation of engineering design changes impacting the reliability or maintainability of one part upon the entire system, and an evaluation of program financial and operational metrics under different scenarios. Financial simulation modeling enables management to understand the financial risk due to different operational scenarios. Furthermore, this modeling provides a confidence related to meeting financial and profit goals. Also, evaluation of strategies to mitigate supply chain risks, include, but are not limited to catastrophic damage to equipment, loss of a warehouse due to fire or other calamity, or availability of maintainers.

Utilizing a graphical representation of stock level over time conveys the impact of inventory policy decisions in a part-at-a-time tactical analysis tool 806. This graphical representation couples a traditional stock level and reorder point graph, graph of scheduled and unscheduled demand, serviceable assets, assets due in from procurement, assets due in from repair, backorders, net position (serviceable assets+assets due in from procurement or repair−backorders), and safety stock The inventory management software module 807 contains the optimized ROP and ROQ recommendations of the strategic inventory optimization software module 804. This module is also referred to as the order execution and inventory management system. This system manages repairables to a stock level, buying a new part when one is condemned and the stock level falls, and manages consumables to a stock level and reorder point, placing an order when stock falls to or below the reorder point in a reorder quantity which replenishes stock to the stock level.

The various solvers 808 are run on a subset of parts, or an individual part, in order to create a more accurate ROP and ROQ based upon the additional analysis performed by the solver. The individual solvers override the ROP and ROQ recommendations of the Strategic Inventory Optimization Software Module 804.

Figure 9:
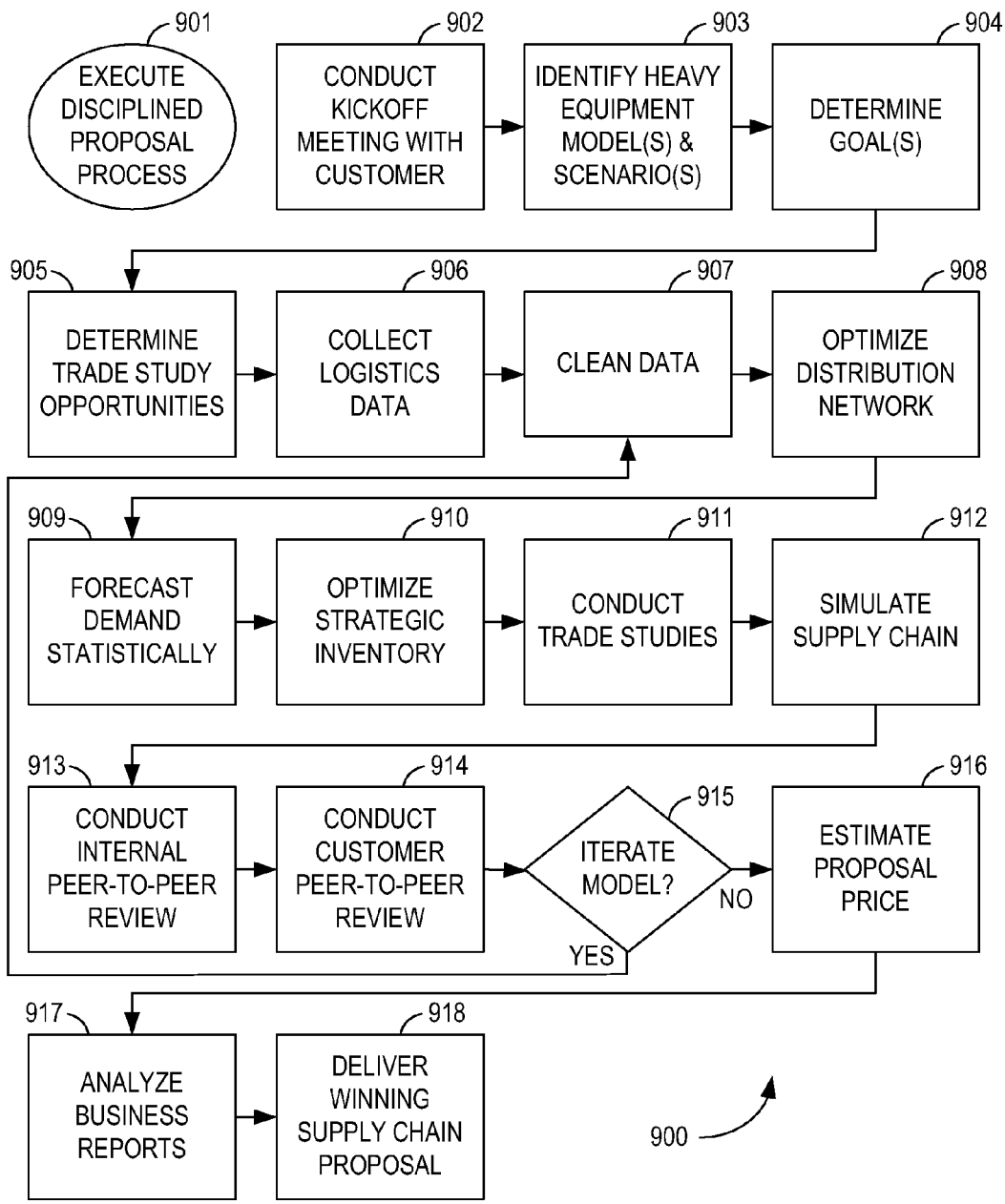
FIG. 9 illustrates an operational flow performed during the proposal process when bidding or proposing to manage a supply chain for maintaining equipment or assets.
Figure 10:
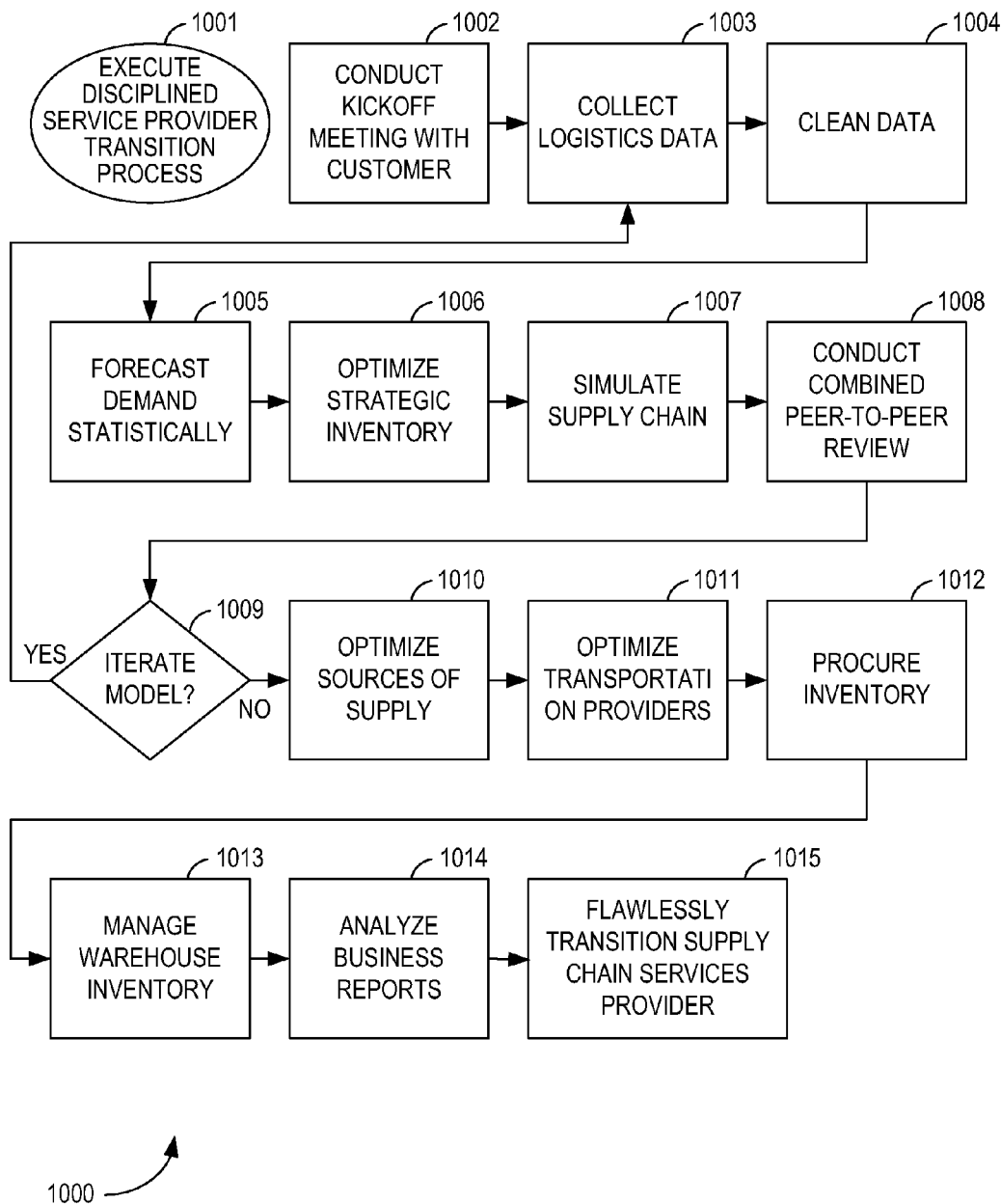
FIG. 10 illustrates an operational flow performed during the transition after winning a proposal and before commencing management of a supply chain for maintaining equipment or assets.
Figure 11:
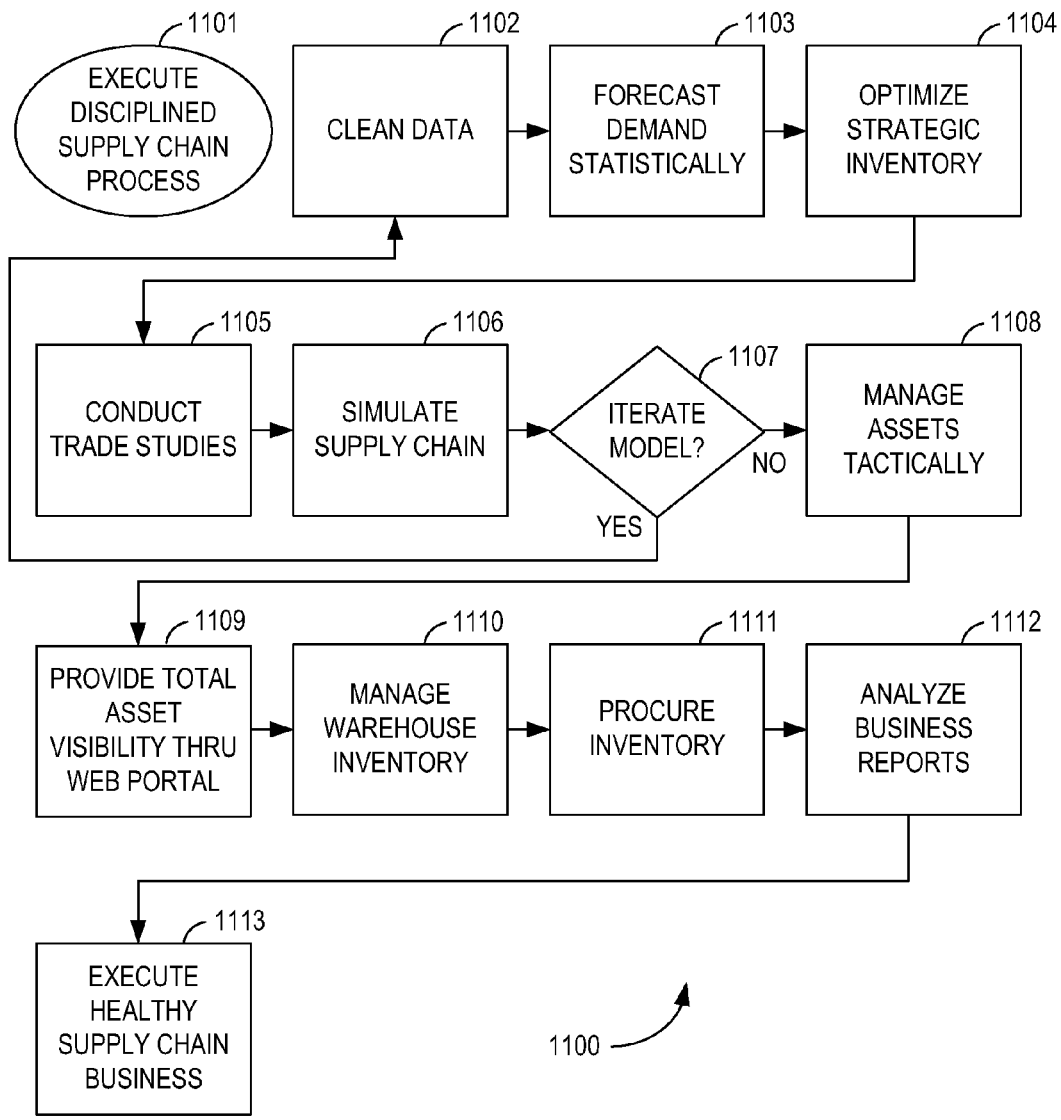
FIG. 11 illustrates an operational flow performed during sustaining operations when managing a supply chain process for maintaining equipment or assets.

FIGS. 9-11 illustrate an operational flow performed during different phases of managing a supply chain for maintaining equipment or assets according to an illustrative embodiment of the invention. The operational sequencing of the systems ensures that where the same clean data is required as input to a plurality of systems, that all systems make decisions based upon the same clean data by making that data available in a central data repository or repositories. Furthermore, where one or more systems have the ability to change the cleaned data 102 used by another system or systems, making that changed data available in a central data repository or repositories 116 ensures that all systems make decisions based upon the same changed, or updated, data. Where data required as the input to one successor system may be created as the output of a previously run predecessor system, the systems may be operated in a sequence such that when one system is operated all requisite data is available, and this data may be available in a central data repository or repositories. Thus, where more than one system has the capability of analyzing data to make a decision, consistency is maintained by operating the systems so as to generally make the decision once in the predecessor system and use the results of the decision in the successor system or systems. Still furthermore, the operational sequencing of the systems, and the selection of the relevant systems, is dependent upon the phase of the business process.

FIG. 9 illustrates an operational flow 600 performed during the proposal process when bidding or proposing to manage a supply chain for maintaining equipment or assets. Utilizing a disciplined business process to execute a disciplined proposal process 901 for the purpose of acquiring a business relationship to maintain equipment comprises operation of at least two of the following steps: a kickoff meeting between customer and contractor 902, identifying requirements for the customer's equipment 903, determining operational goals for the customer's equipment 904, determining opportunities for trade studies 905, collecting logistics data that is relevant to equipment maintenance requirements of the customer 906, cleaning the data 907, optimizing a network of distribution centers, or warehouses 908, forecasting demand 909 based on statistical analysis of the data, optimizing an inventory of spare parts 910 based upon the demand forecast 909 and operational requirements, performing trade studies 911 to evaluate changes to part design or to the supply chain, simulating the supply chain 912 to reduce risk based upon the network of distribution centers and the demand forecast and the optimized inventory, reviewing the results of the inventory optimization and the supply chain simulation between technical analysts within the supply chain service provider, which is known as an internal peer-to-peer review 913, reviewing the results of the inventory optimization and the supply chain simulation the customer's technical analysts, which is known as an external peer-to-peer review 914, iterating 915 the inventory optimization 910 and/or the supply chain simulation 912 based upon the recommendation of the technical analysts, estimating 916 the cost of managing the supply chain utilizing the expected requirements estimated by the inventory optimization and/or simulation, reporting 917 on each step in the process, as well as the overall process, and providing a proposal to manage a supply chain for a customer's equipment 918 for the purpose of acquiring new business.

FIG. 10 illustrates an operational flow 1000 performed during the transition after winning a proposal and before commencing management of a supply chain for maintaining equipment or assets according to an illustrative embodiment of the invention. When utilizing the disciplined business process to execute a disciplined service provider transition process 1001 for the purpose of executing a new business relationship to maintain equipment, either new equipment being maintained for the first time, or existing equipment that was previously maintained by a different maintainer, comprises operation of at least two of the following steps: a kickoff meeting between customer and contractor 1002, collecting logistics data 1003 that is relevant to equipment maintenance requirements of the customer, cleaning the data 1004, forecasting demand 1005 based on statistical analysis of the data, optimizing an inventory of spare parts 1006 based upon the demand forecast 1005 and operational requirements, simulating the supply chain 1007 to reduce risk based upon the network of distribution centers and the demand forecast 1005 and the optimized inventory 1006, reviewing the results of the inventory optimization and the supply chain simulation between technical analysts within the supply chain service provider and the customer 1008, iterating 1009 the inventory optimization and/or the supply chain simulation based upon the recommendation of the technical analysts, optimizing the source selection 1010 of spare parts manufacturers and repair vendors, optimizing the selection of transportation providers 1011; procuring new spare parts 1012 when stock levels in the warehouse drop to or below reorder point, managing the spare parts in a warehouse 1013 to the optimized inventory levels, reporting 1014 on each step in the process, as well as the overall process, and transitioning responsibility for managing a supply chain for a customer's equipment to a service provider 1015.

FIG. 8 illustrates an operational flow 1100 performed during sustaining operations when managing a supply chain process for maintaining equipment or assets according to an illustrative embodiment of the invention. When utilizing the disciplined business process to execute a disciplined supply chain process 1101 for the purpose of continuing an established business relationship to maintain equipment comprises operation of at least two of the following: collecting logistics data that is relevant to equipment maintenance requirements of the customer, cleaning the data 1102, forecasting demand 1103 based on statistical analysis of the data, optimizing an inventory of spare parts 1104 based upon the demand forecast and operational requirements, performing trade studies 1105 to evaluate changes to part design or to the supply chain, simulating the supply chain 1106 to reduce risk based upon the network of distribution centers and the demand forecast and the optimized inventory, iterating 1107 the inventory optimization and/or the supply chain simulation based upon the recommendation of the technical analysts, managing the optimized spare parts tactically 1108 on a day-to-day basis, providing total visibility 1109 to all spare parts or assets in the supply chain, managing the spare parts in a warehouse 1110 to the optimized inventory levels, procuring new spare parts 1111 when stock levels in the warehouse drop to or below reorder point, reporting 1112 on each step in the process, as well as the overall process, and managing a supply chain for a customer's equipment on an on-going basis 1113.

By looking at one part at a time, the above described methods, systems, and computer program products eliminate constraints on the number of uses of a tactical supply chain tool, because (a) there is no interaction between parts, and (b) companies managing assets traditionally have only one person responsible for a given asset. The process enabled herein (1) automates the collection and entry of data, based on a database containing the relevant data for each part number being managed, (2) adds a graphical representation of inventory levels over time, providing the same data but in a visual context, (3) allows what-if analysis, enabling an asset manager to save and review multiple scenarios before selecting one to implement, and (4) electronically loads the resulting stock level and reorder point into the inventory management system.

Thus, the present invention is presently embodied as methods, systems, configurations, computer program products or computer readable mediums encoding computer programs for managing a supply chain process to maintain equipment. While the invention has been described in terms of various specific embodiments, those skilled in the art will recognize that the invention can be practiced with modification within the spirit and scope of the claims.

What is claimed is:

1. A computer program product for managing a supply chain process to maintain equipment, said computer program product comprising a computer-readable storage medium having computer-readable program code embodied in said medium, the computer-readable program code comprising:
   a first executable portion for identifying and capturing data relevant to one or more sets of equipment maintenance requirements for a customer;
   a second executable portion for providing access to the capabilities of a plurality of inventory management, supply chain management, and equipment maintenance applications for preprocessing of the identified and captured data;
   a third executable portion for receiving the preprocessed data from the plurality of applications;
   a fourth executable portion for integrating the preprocessed data into a solution to the one or more sets of equipment maintenance requirements by:
      grouping a plurality of service parts by functionality to create a plurality of functional groupings of service parts,
      determining an appropriate distribution for statistical demand forecasting of a functional grouping,
      using the same distribution to generate the statistical demand forecast for service parts of the same functional grouping, and
      using a library to cross-reference which distribution applies to which functional grouping; and
   a fifth executable portion operable to:
      determine a ratio of service part failure rates based upon a percentage of time in which a service part of the plurality of service parts operates in specific operating modes associated with the service part; and
      calculate a supply availability of at least a portion of the plurality of service parts based on the determined ratios of service part failure rates corresponding to the portion of the service parts.

2. A computer program product according to claim 1 wherein to integrate the preprocessed data into a solution, said fourth executable portion is operable to:
  forecast an inventory demand based on the preprocessed data; and
  optimize a product inventory based on the forecasted inventory demand.

3. A computer program product according to claim 2 further comprising an executable portion for:
  monitoring product flow to the customer to determine actual consumption;
  detecting variances between the forecasted inventory demand and the actual consumption;
  forwarding alerts in response to detected variances;
  receiving adjustments to stocking level reorder points to compensate for variances; and
  refining the forecasted inventory demand based on the received adjustments.

4. A computer program product according to claim 2 wherein to forecast an inventory demand based on the preprocessed data, said fourth executable portion is operable for at least one of cleaning, consolidating, and correlating the preprocessed data.

5. A computer program product according to claim 2 wherein to optimize a product inventory based on the forecasted inventory demand, said fourth executable portion is operable for recommending a quantity of spare products to order and a location from which to draw the spare products.

6. A computer program product according to claim 3 wherein to forward alerts in response to detected variances, said fifth executable portion is operable for sending an electronic message to key personnel responsible for compensating for variances.

7. A computer program product according to claim 3 further comprising an executable portion operable for:
  determining a root cause of at least one of the variances; and
  providing a solution to attempt to eliminate the root cause of at least one of the variances.

8. A computer program product according to claim 1 wherein to integrate the preprocessed data into a solution, said fourth executable portion is operable to create at least one of order fulfillment plans, asset procurement plans, and distribution plans.

9. A computer program product according to claim 3 wherein to monitor product flow to the customer to determine actual consumption, said executable portion is operable to generate and monitor at least one of a real-time status of each supply chain product, and a summarized view of the supply chain assets.

10. A computer program product according to claim 1 wherein to integrate the preprocessed data into a solution, said fourth executable portion is operable to provide a suggested optimization of a network of distribution centers which warehouse spare parts required to maintain the equipment.

11. A computer program product according to claim 1 further comprising an executable portion operable to prepare financial estimates of the cost of managing a supply chain to maintain equipment for use in one or more of proposals, transition of supply chain management responsibility, and execution of supply chain management.

12. A computer program product according to claim 1 further comprising an executable portion operable to:
  optimize the selection of providers and repair agents for consumable and repairable spare parts based upon at least one of cost, procurement lead time, repair turnaround time, manufacturing capability, repair capability, long term contracting to vendors for an annual volume of manufacturing or repair of like parts rather than on a per part number basis; and
  identify when to preposition raw materials at a manufacturer or repair agent for at least one of shortening lead times and hedging against variability in raw materials cost.

13. A computer program product according to claim 1 further comprising an executable portion operable to optimize the selection of transportation vendors based upon at least one of cost, transportation network and/or routes, locations served, ability to import and/or export parts through international customs, and opportunities for volume contracts for a specified level of transportation rather than on a per shipment basis.

14. A computer program product according to claim 1 further comprising an executable portion operable to recommend procurement of additional inventory and scrapping excess inventory on at least one of a tactical, day-to-day, part-by-part, strategic, and global basis.

15. A computer program product according to claim 1 further comprising an executable portion operable for identifying a location of all assets through a web portal which provides total asset visibility though the ability to interface with at least one of customer databases, transportation vendor databases, warehouse and stocking location databases, repair agent databases, manufacturer databases, and equipment operator databases to determine whether a spare part is serviceable, unserviceable, awaiting determination of reparability, awaiting repair, in repair, condemned, awaiting disposal, in shipment, in receiving, awaiting inspection to verify the contents of a shipment, in inventory and ready for issue, in inventory and committed to a customer, in inventory and owned by a particular customer and unavailable to provide to a different customer, in inventory and owned by a particular customer but available to loan to a different customer under agreed upon circumstances.

16. A computer program product according to claim 1 further comprising an executable portion operable for generating a report on one or more of contractual metrics, operational metrics, inventory on hand, inventory on order, inventory in repair, and inventory on backorder.

17. A computer program product according to claim 1 further comprising an executable portion operable to provide a report listing, graphing, or listing and graphing consumable parts optimized to a fill rate goal by a strategic inventory optimization model.

18. A computer program product according to claim 1 further comprising an executable portion operable as a manufacturing requirements planning model for piece parts usage and depot maintenance of repairable parts.

19. A computer program product according to claim 1 further comprising an executable portion operable to determine whether components having a limited shelf life should have their stock levels and reorder points adjusted.

20. A computer program product according to claim 1 further comprising an executable portion operable to determine a ratio of the time to return repairable spare parts from a main operating location to a depot maintenance facility to the time to return repairable spare parts from a forward operating location to a depot maintenance facility.

21. A computer program product according to claim 1 further comprising an executable portion operable to determine a ratio of the time to ship an operational repairable spare part from a stocking locating to a main operating location, and the time to ship an operational repairable spare part from a stocking location to a forward operating location.

22. A computer program product according to claim 1 further comprising an executable portion operable to:
- normalize the identified, captured, and preprocessed data to a common unit of measure;
- determine the best data source when conflicting values of the same data element are available from different source systems;
- provide defaults for missing supply chain data; and
- evaluate any data relating to parts and components according to demand, lead time, price, condemnation rate, repair cycle time, not repairable this station (NRTS) rate, procurement lead time, and annual buy rates.

23. A computer program product according to claim 1 further comprising an executable portion operable to:
- determine lifetime buy requirements for one or more of parts which are going out of production and parts that contain piece parts which have or are likely to go out of production; and
- determine requirements for the number of parts to cannibalize when equipment is phased out or disposed of.

24. A computer program product according to claim 1 further comprising an executable portion operable to determine at least one of a manufacturers actual cost of repair and a maintainers actual cost of repair when parts are covered under an OEM warranty.

25. A computer program product according to claim 1 further comprising an executable portion operable to:
- evaluate supercession, substitution, and interchangeability rules with regards to parts and their associated part numbers;
- aggregate a demand for one or more parts to the most current part number revision; and
- aggregate inventory of alternate part numbers together for consideration of available part number alternatives.

26. A computer program product according to claim 1 further comprising an executable portion operable to synchronize the purchase of parts to support the manufacturing of equipment with the purchase of parts used as spares.

* * * * *